United States Patent
Lende et al.

(10) Patent No.: US 11,795,364 B2
(45) Date of Patent: Oct. 24, 2023

(54) LOW CARBON FOOTPRINT EXPANSIVE COMPOSITION AND METHODS OF MAKING AND USING SAME

(71) Applicant: Halliburton Energy Services, Inc., Houston, TX (US)

(72) Inventors: Gunnar Lende, Stavanger (NO); Rahul Jadhav, Stavanger (NO); Thomas Jason Pisklak, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 17/509,756

(22) Filed: Oct. 25, 2021

(65) Prior Publication Data
US 2023/0125089 A1    Apr. 27, 2023

(51) Int. Cl.
| | |
|---|---|
| *E21B 33/14* | (2006.01) |
| *C09K 8/467* | (2006.01) |
| *C04B 28/04* | (2006.01) |
| *C04B 22/14* | (2006.01) |
| *C04B 22/12* | (2006.01) |
| *C04B 14/14* | (2006.01) |
| *C04B 18/14* | (2006.01) |
| *C04B 14/16* | (2006.01) |
| *C04B 14/10* | (2006.01) |
| *C04B 18/08* | (2006.01) |

(Continued)

(52) U.S. Cl.
CPC .............. *C09K 8/467* (2013.01); *C04B 14/06* (2013.01); *C04B 14/104* (2013.01); *C04B 14/14* (2013.01); *C04B 14/16* (2013.01); *C04B 18/08* (2013.01); *C04B 18/141* (2013.01); *C04B 18/146* (2013.01); *C04B 22/124* (2013.01); *C04B 22/147* (2013.01); *C04B 28/04* (2013.01); *E21B 33/14* (2013.01); *C04B 2103/10* (2013.01)

(58) Field of Classification Search
CPC ............................... C09K 8/467; E21B 33/14
USPC ........................................................ 166/292
See application file for complete search history.

(56) References Cited

U.S. PATENT DOCUMENTS

| | | |
|---|---|---|
| 8,333,240 B2 | 12/2012 | Roddy |
| 8,466,224 B2 | 6/2013 | Georges et al. |
| 9,926,234 B2 * | 3/2018 | Toussaint ................ C04B 28/04 |

(Continued)

FOREIGN PATENT DOCUMENTS

| | | |
|---|---|---|
| WO | 20080146011 A2 | 12/2008 |
| WO | 2020146551 A1 | 7/2020 |

OTHER PUBLICATIONS

Foreign Communication from Related Application—International Search Report and Written Opinion of the International Searching Authority, International Application No. PCT/US2022/043614, dated Dec. 27, 2022, 9 pages.

*Primary Examiner* — William D Hutton, Jr.
*Assistant Examiner* — Ashish K Varma
(74) *Attorney, Agent, or Firm* — Conley Rose, P.C.; Rodney B. Carroll

(57) ABSTRACT

Disclosed herein is a composition comprising a cementitious material, a pozzolanic material, aplite, and an aqueous fluid. Also disclosed herein is a method of servicing a wellbore penetrating a subterranean formation, comprising: placing the composition into the wellbore; and allowing the composition to form a set cement. The composition can develop suitable mechanical properties and permeability after setting in a wellbore and be expansive.

24 Claims, 12 Drawing Sheets

(51) Int. Cl.
*C04B 14/06* (2006.01)
*C04B 103/10* (2006.01)

(56) References Cited

U.S. PATENT DOCUMENTS

| | | |
|---|---|---|
| 10,233,116 B1 | 3/2019 | Guynn |
| 2008/0196628 A1 | 8/2008 | Santra et al. |
| 2014/0374097 A1* | 12/2014 | Morgan .................. C04B 28/02 |
| | | 166/293 |
| 2017/0274318 A1* | 9/2017 | Constantz .............. B01D 53/22 |
| 2018/0072938 A1 | 3/2018 | Mazyar et al. |
| 2018/0312435 A1 | 11/2018 | Berodier et al. |
| 2019/0367422 A1* | 12/2019 | Bui ....................... C04B 24/122 |
| 2019/0367796 A1* | 12/2019 | Pisklak ................... C09K 8/46 |
| 2020/0123054 A1* | 4/2020 | Guynn ...................... C04B 7/02 |
| 2020/0181475 A1 | 6/2020 | Dighe et al. |

* cited by examiner

LOW CARBON FOOTPRINT EXPANSIVE COMPOSITION AND METHODS OF MAKING AND USING SAME

FIELD

This application relates to a composition, and more specifically this application relates to a composition that can be used in the recovery of natural resources from a wellbore penetrating a subterranean formation.

BACKGROUND

This disclosure relates generally to a composition. More specifically, it relates to a composition and methods of making and using same for treating a wellbore penetrating a subterranean formation, for example during a cementing operation.

Natural resources such as gas, oil, and water residing in a subterranean formation are usually recovered by drilling a wellbore down to the subterranean formation while circulating a drilling fluid, also referred to as drilling mud, in the wellbore. After terminating circulation of the drilling fluid, a string of pipe, e.g., casing, is run in the wellbore. The drilling fluid is then usually circulated downward through the interior of the pipe and upward through the annulus, which is located between the exterior of the pipe and the walls of the wellbore. Next, primary cementing is typically performed whereby a cement slurry is placed in the annulus and permitted to set into a hard mass (i.e., sheath) to thereby attach the string of pipe to the walls of the wellbore and seal the annulus. Subsequent secondary cementing operations may also be performed. One example of a secondary cementing operation is squeeze cementing whereby a cement slurry is employed to plug and seal off undesirable flow passages in the cement sheath and/or the casing.

While cement slurries have been developed heretofore, challenges continue to exist with the successful use of cement slurries in subterranean cementing operations. The manufacture of cement is a very energy-intensive industry. Much of this energy is producing by burning fossil fuels such as coal, contributing to the production of "greenhouse gases." One of the most discussed of these greenhouse gases is carbon dioxide ($CO_2$). The effect certain activities have on the climate in terms of the total amount of greenhouse gases produced is often described as a "carbon footprint." In addition, volumetric shrinkage during hydration process of a cement slurry can lead to poor zonal isolation through the formation of micro-annuli and reduced shear bond strength between the casing and cement. The resulting micro-annuli represent flow channels which offer communication possibilities within the annulus, especially for gases. Relatively low permeability (e.g., less than 5 micro Darcy) of a set cement barrier is also a design criterion. Therefore, an ongoing need exists for an expansive cement slurry that has low carbon footprint and permeability.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

FIG. 5A represents curing at 40° C./104° F. and FIG. 5B represents curing at 80° C./176° F.

DETAILED DESCRIPTION

Figure 1:
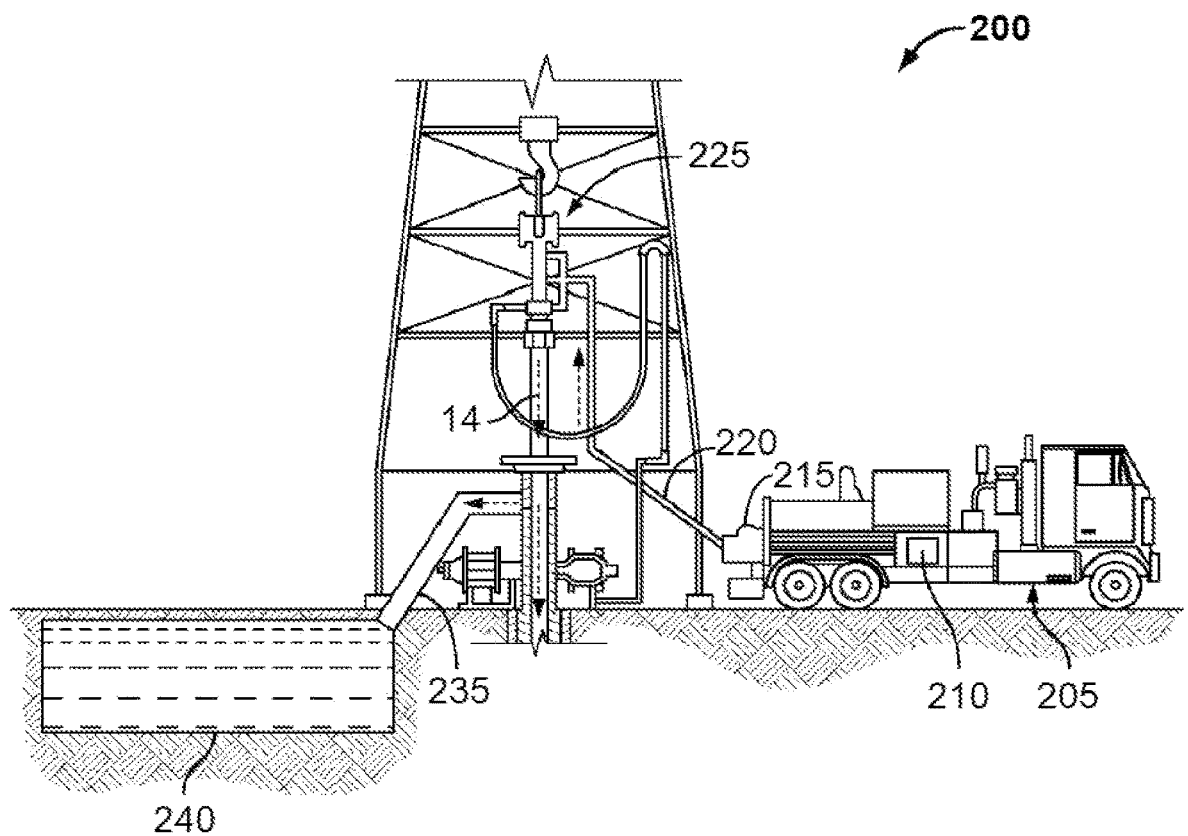
FIG. 1 illustrates surface equipment that can be used in the placement of a composition in accordance with some embodiments of the disclosure.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

It is to be understood that "subterranean formation" encompasses both areas below exposed earth and areas below earth covered by water such as ocean or fresh water. Herein in the disclosure, "top" means the well at the surface (e.g., at the wellhead which may be located on dry land or below water, e.g., a subsea wellhead), and the direction along a wellbore towards the well surface is referred to as "up", "bottom" means the end of the wellbore away from the surface, and the direction along a wellbore away from the wellbore surface is referred to as "down." For example, in a horizontal wellbore, two locations may be at the same level (i.e., depth within a subterranean formation), the location closer to the well surface (by comparing the lengths along the wellbore from the wellbore surface to the locations) is referred to as "above" the other location, the location farther away from the well surface (by comparing the lengths along the wellbore from the wellbore surface to the locations) is referred to as "below" or "lower than" the other location.

Disclosed herein is a composition comprising a cementitious material, a pozzolanic material, aplite, and an aqueous fluid. Herein a "cementitious material" refers to a settable material that makes up a concrete mixture. In embodiments, the cementitious material comprises a Portland cement. Portland cements that are suited for use in the disclosed composition include, but are not limited to, API Class A, C, G, H, low sulfate resistant cements, medium sulfate resistant cements, high sulfate resistant cements, other construction cements, or combinations thereof. The API class A, C, G, and H cements are classified according to API Specification 10. Additional examples of Portland cements suitable for use in the present disclose include, without limitation, those classified as ASTM Type I, II, III, IV, or V. In embodiments, the cementitious material comprises a class C cement. In embodiments, the cementitious material comprises a class G cement.

The cementitious material can be present in the composition in an amount of from about 1 weight percent by weight of blend (% BWOB) to about 90% BWOB based on the total weight of a cement blend comprising the cementitious material, the pozzolanic material, and the aplite. Alternatively, the cementitious material can be present in the composition in an amount of from about 10% BWOB to about 80% BWOB, alternatively from about 20% BWOB to about 70% BWOB, alternatively from about 30% BWOB to about 60% BWOB, or alternatively from about 40% BWOB to about 50% BWOB.

The pozzolanic material can comprise a material selected from the group consisting of Trass flour, recycled glass, fly ash, bottom ash, cenospheres, glass bubbles, slag, clays, calcined clays, partially calcined clays, kaolinite clays, lateritic clays, illite clays, crystalline silica, silica flour, cement kiln dust, volcanic rock, natural pozzolans, mine tailings, diatomaceous earth, zeolite, shale, ground vitrified pipe, agricultural waste ash, ground granulated blast furnace slag, bentonite, pumice, and any combination thereof.

In embodiments, the pozzolanic material comprises Trass flour. The Trass flour is from Trass, which is the name of a volcanic tuff. Trass is a grey or cream-colored fragmental rock, largely composed of pumiceous dust, and may be regarded as a trachytic tuff. Trass can have similar ingredients as Italian pozzolana. In embodiments, the Trass flour has a d50 particle size distribution of equal to or less than about 50 microns, alternatively equal to or less than about 25 microns, alternatively equal to or less than about 15 microns, alternatively equal to or less than about 5 microns, alternatively equal to or less than about 1 micron, or alternatively equal to or less than about 0.1 micron.

In some embodiments, the pozzolanic material comprises pumice. Pumice is a type of extrusive volcanic rock, produced when lava with water and gases is discharged from a volcano. In other embodiments, the pozzolanic material comprises calcined clay, which can be formed by heating clay at high temperatures (e.g., equal to or greater than 1200° F.). In other embodiments, the pozzolanic material comprises ground granulated blast furnace slag, which can be produced by quenching molten iron slag from a blast furnace in water or steam, to produce product that is then dried and ground into a fine powder. In other embodiments, the pozzolanic material comprises fly ash, which can be a byproduct of coal-fired electric generating plants. In some embodiments, the pozzolanic material comprises bentonite.

The pozzolanic material can be present in the composition in an amount of from about 1% BWOB to about 90% BWOB based on the total weight of the cement blend. Alternatively, the pozzolanic material can be present in the composition in an amount of from about 5% BWOB to about 80% BWOB, alternatively from about 10% BWOB to about 70% BWOB, alternatively from about 10% BWOB to about 60% BWOB, alternatively from about 15% BWOB to about 50% BWOB, or alternatively from about 15% BWOB to about 35% BWOB.

In some embodiments, the aplite comprises granite. The granite can be in a form of granite powder. Aplite refers to any intrusive igneous rock of simple composition, such as granite, composed only of alkali feldspar, muscovite mica, and quartz; in a more restricted sense, uniformly fine-grained (e.g., less than 2 millimetres [0.08 inch]), light-coloured, intrusive igneous rocks that have a characteristic granular texture. The aplite can be present in the composition in an amount of from about 1% BWOB to about 90% BWOB based on the total weight of the cement blend. Alternatively, the aplite can be present in the composition in an amount of from about 5% BWOB to about 80% BWOB, alternatively from about 10% BWOB to about 70% BWOB, alternatively from about 10% BWOB to about 60% BWOB, alternatively from about 15% BWOB to about 50% BWOB, or alternatively from about 15% BWOB to about 35% BWOB.

The composition can comprise an aqueous fluid. Generally, the aqueous fluid may be from any source, provided that it does not contain an amount of components that may undesirably affect the other components in the composition. For example, the aqueous fluid can be selected from a group consisting essentially of fresh water, surface water, ground water, produced water, sea water, salt water, brine (e.g., underground natural brine, formulated brine, etc.), and combinations thereof. A formulated brine may be produced by dissolving one or more soluble salts in water, a natural brine, or sea water. Representative soluble salts include the chloride, bromide, acetate, and formate salts of potassium, sodium, calcium, magnesium, and zinc. The aqueous fluid can be present in the composition in an amount effective to provide a slurry having desired (e.g., job or service specific) rheological properties. In embodiments, the aqueous fluid is present in the composition in an amount effective to form a pumpable slurry of the composition.

In some embodiments, the composition further comprises silica fume. In some embodiments, the silica fume is a component of the cement blend, and the cement blend comprises the cementitious material, the pozzolanic material, the aplite, and the silica fume. The silica fume can be present in the composition in an amount of from about 0.5% BWOB to about 50% BWOB based on the total weight of the cement blend. Alternatively, the silica fume can be present in the composition in an amount of from about 0.5% BWOB to about 40% BWOB, alternatively from about 1% BWOB to about 30% BWOB, alternatively from about 1% BWOB to about 20% BWOB, or alternatively from about 1% BWOB to about 10% BWOB. The silica fume can also be included in the composition in the form of a liquid, in such embodiments the silica fume is added to a fluid (e.g., the liquid phase) of the composition instead of being a part of the cement blend. In some embodiments, the silica fume is in forms of both a solid and a liquid, and is added to the cement blend and the fluid, respectively.

In some embodiments, the composition comprises the cementitious material, the pozzolanic material, aplite, the silica fume, and the aqueous fluid, wherein the pozzolanic material comprises Trass flour and the aplite comprises granite. In some embodiments, the composition comprises the cementitious material, the pozzolanic material, aplite, the silica fume, and the aqueous fluid, wherein the cementitious material comprises a Portland cement, the pozzolanic material comprises Trass flour, and the aplite comprises granite.

In embodiments, the composition further comprises a sodium chloride and sodium sulfate blend. The sodium chloride and sodium sulfate blend can operate as an accelerator. The sodium chloride can be present in the composition in an amount ranging from about 0.01% BWOB to about 10% BWOB based on the total weight of the cement blend. Alternatively, the sodium chloride can be present in the composition in an amount of from about 0.01% BWOB to about 8% BWOB, alternatively from about 0.1% BWOB to about 6% BWOB, alternatively from about 0.1% BWOB to about 5% BWOB, or alternatively from about 0.1% BWOB to about 1% BWOB. The sodium sulfate can be present in the composition in an amount ranging from about 0.01% BWOB to about 10% BWOB based on the total weight of the cement blend. Alternatively, the sodium sulfate can be present in the composition in an amount of from about 0.01% BWOB to about 8% BWOB, alternatively from about 0.1% BWOB to about 6% BWOB, alternatively from about 0.1% BWOB to about 5% BWOB, or alternatively from about 0.1% BWOB to about 1% BWOB. In embodiments, a molar ratio of sodium chloride to sodium sulfate in the composition is in a range of from about 1:10 to about 10:1, alternatively from about 1:5 to about 5:1, or alternatively from about 1:2 to about 2:1. In some embodiments, the sodium chloride and sodium sulfate blend can be added in the form of a liquid.

In some embodiments, the composition excludes an expansion additive. In other embodiments the composition includes an expansion additive. For example, an expansion additive can be present in the composition in an amount of equal to or less than about 10% BWOB based on the total weight of the cement blend, alternatively equal to or less than about 5% BWOB, alternatively from about 0.5% BWOB to about 4% BWOB, or alternatively equal to or less than about 0.001% BWOB.

In embodiments, the composition further comprises a pre-blended stabilizing agent. The pre-blended stabilizing agent can comprise bentonite, sepiolite, attapulgite, water swellable synthetic clays, Diutan gum, xanthan gum, wellan gum, guar gum, modified guar gum, hydroxy ethyl cellulose, modified cellulose, other classes of polysaccharides, or combinations thereof. In embodiments, the pre-blended stabilizing agent is prepared before making the composition. The pre-blended stabilizing agent can be present in the composition in an amount ranging from about 0.01% BWOB to about 10% BWOB based on the total weight of the cement blend, alternatively from about 0.05% BWOB to about 6% BWOB, or alternatively from about 0.1% BWOB to about 3% BWOB. The stabilizing agent can be added in a form of liquid or powder.

In some embodiments, the composition further comprises limestone. In such embodiments, the limestone is a component of the cement blend. Limestone is a type of carbonate sedimentary rock. Limestone can be composed mostly of minerals calcite and aragonite, which are different crystal forms of calcium carbonate. In embodiments, limestone is present in the composition in an amount ranging from about 0.01% BWOB to about 90% BWOB based on the total weight of the cement blend, alternatively from about 0.05% BWOB to about 50% BWOB, or alternatively from about 0.1% BWOB to about 30% BWOB.

In embodiments, the composition further comprises one or more additives. The one or more additives can comprise weighting agents, retarders, accelerators, activators, gas migration control additives, lightweight additives, gas-generating additives, mechanical-property-enhancing additives (e.g., carbon fibers, glass fibers, metal fibers, minerals fibers, polymeric elastomers, latexes, etc.), lost-circulation materials, filtration-control additives, fluid-loss-control additives, defoaming agents, foaming agents, transition time modifiers, dispersants, thixotropic additives, suspending agents, or combinations thereof. One having ordinary skill in the art, with the benefit of this disclosure, should be able to select one or more appropriate additives for a particular application. The one or more additives can be present in the composition in an amount ranging from about 0.01% BWOB to about 50% BWOB based on the total weight of the cement blend, alternatively from about 0.05% BWOB to about 40% BWOB, alternatively from about 0.1% BWOB to about 30% BWOB, alternatively from about 1% BWOB to about 20% BWOB, or alternatively from about 1% BWOB to about 10% BWOB.

The composition disclosed herein can have any suitable density, including, but not limited to, in a range of from about 500 kg/m$^3$ to about 3,000 kg/m$^3$, alternatively from about 800 km/m$^3$ to about 2,800 kg/m$^3$, alternatively from about 1,200 kg/m$^3$ to about 2,800 kg/m$^3$, alternatively from about 1,200 kg/m$^3$ to about 2,600 kg/m$^3$, or alternatively from about 1,300 kg/m$^3$ to about 2,100 kg/m$^3$.

The composition can have a positive 7-day circumferential change in dimension in a range of from about 0.01% to about 2% at from about 20° C./68° F. to about 150° C./302° F., alternatively from about 0.05% to about 1%, alternatively from about 0.05% to about 0.8%, alternatively from about 0.05% to about 0.4%, or alternatively from about 0.05% to about 0.2%, when measured in a ring expansion test in accordance with test standard API 10B-5 on Determination of shrinkage or expansion under conditions of free access of water at atmospheric pressure—Anmlar ring test. The time is 7 days after mixing the cement blend with the aqueous fluid.

The composition can have a positive 14-day circumferential change in dimension in a range of from about 0.01% to about 2% at from about 20° C./68° F. to about 150° C./302° F., alternatively from about 0.05% to about 1%, alternatively from about 0.05% to about 0.8%, alternatively from about 0.05% to about 0.4%, or alternatively from about 0.05% to about 0.2%, when measured in a ring expansion test in accordance with test standard API 10B-5. The time is 14 days after mixing the cement blend with the aqueous fluid. The expansion (e.g., a positive 7-day circumferential change, 14-day circumferential change) can be increased by including a standard expansion material (e.g., an expansion additive) in the composition when a higher expansion is desired.

In embodiments, the composition has a thickening time. The thickening time herein can refer to the time required for the composition to achieve 50. Bearden units of Consistency (Bc) after preparation of the composition. At about 50 Bc, the composition undergoes a conversion from a pumpable fluid state to a non-pumpable gel. The thickening time can be an important design factor as the composition may be pumped thousands of meters through conduit and may take hours to place. Other values can be used to define the thickening time too, such as 30, 40, 70 or 100 Bc. In order to keep the composition in a pumpable state for an appropriate amount of time, additives such as retarders and accelerators can be added to modulate the pump time by shortening or extending the thickening time. A measurement of Bearden units of Consistency (Bc) can be considered a thickening time test which is performed on a moving fluid. In a thickening time test, an apparatus including a pressurized consistometer can apply temperature and pressure to a slurry (e.g., a composition) while the slurry is being stirred by a paddle. A resistor arm and potentiometer coupled to the paddle can provide an output in units of Bearden units of consistency.

In embodiments, the composition has a thickening time to reach about 50 Bc in a range of from about 2.0 hours to about 20.0 hours at about 50° F., alternatively from about 2.0 hours to about 18.0 hours, alternatively from about 2.0 hours to about 15.0 hours, alternatively from about 3.0 hours to about 10.0 hours, when measured in accordance with test standard API-RP-10B-2.

In embodiments, the composition has a thickening time to reach about 50 Bc in a range of from about 2.0 hours to about 20.0 hours at about 68° F., alternatively from about 3.0 hours to about 18.0 hours, alternatively from about 3.0 hours to about 14.0 hours, alternatively from about 3.0 hours to about 9.0 hours, alternatively from about 3.0 hours to about 8.0 hours, alternatively from about 3.0 hours to about 7.0 hours, when measured in accordance with test standard API-RP-10B-2.

Compressive strength is generally the capacity of a material or structure to withstand axially directed compression forces. The compressive strength of a composition can be measured at a specified time (e.g., 24 hours) after a cement blend has been mixed with water and the resultant cement slurry is maintained under specified temperature and pressure conditions to form a hardened, set cement. For example, compressive strength can be measured at a time in the range of from about 12 to about 48 hours (or longer) after the cement slurry is mixed, and the cement slurry is maintained typically at a temperature of from 0° C./32° F. to about 204° C./400° F. and a suitable pressure, during which time the cement slurry can set into a hardened mass. Compressive strength can be measured by either a destructive method or non-destructive method. The destructive method physically tests the strength of hardened samples at various points in time by crushing the samples in a compression-testing machine. The compressive strength is calculated from the failure load divided by the cross-sectional area resisting the load and is reported in units of pound-force per square inch (psi). Non-destructive methods can employ an ultrasonic cement analyzer (UCA). A UCA can be available from Fann® Instrument Company, Houston, TX. Compressive strengths can be determined in accordance with API RP 10B-2, Recommended Practice for Testing Well Cements, First Edition, July 2005.

In embodiments, the composition has a time to reach 50 psi (345 kPa) compressive strength (also referred to as "time to reach 50 psi") measured in an ultrasonic cement analyzer (UCA) test in accordance with test standard API-RP-10B-2. The time to reach 50 psi under static conditions in a UCA can be used as an estimation of the initial set time of a composition. The time to reach 50 psi can be the time it takes for a cement slurry to transition from a pumpable fluid state to a hardened set state.

In embodiments, the composition has a time to reach 50 psi compressive strength in a range of from about 2.0 hours to about 24.0 hours at about 20° C./68° F. to about 150° C./302° F. in a UCA test, alternatively from about 2.0 hours to about 20.0 hours, alternatively from about 2.0 hours to about 18.0 hours, alternatively from about 3.0 hours to about 15.0 hours, or alternatively from about 3.0 hours to about 10.0 hours, when measured in accordance with test standard API-RP-10B-2.

In embodiments, the composition has a 24-hour compressive strength (also referred to as "24-hour crush strength" or "24-hour crush compressive strength") measured in accordance with test standard API-RP-10B-2. The 24-hour compressive strength can be in a range of from about 50 psi to about 10,000 psi at from about 10° C./50° F. to about 80° C./176° F. in a UCA test, alternatively from about 100. psi to about 7,500 psi, alternatively from about 200. psi to about 5,500 psi, alternatively from about 250 psi to about 3,500 psi, alternatively from about 300 psi to about 2,500 psi, or alternatively from about 300 psi to about 2,000 psi. The time is 24-hour period after mixing the cement blend with the aqueous fluid.

In embodiments, the composition has a 28-day compressive strength (also referred to as "28-day crush strength" or "28-day crush compressive strength") measured in accordance with test standard API-RP-10B-2. The 28-day compressive strength can be in a range of from about 50 psi to about 10,000 psi at from about 80° C./176° F. to about 150° C./302° F. in a UCA test, alternatively from about 100 psi to about 10,000 psi, alternatively from about 200 psi to about 7,500 psi, alternatively from about 250 psi to about 5,500 psi, alternatively from about 300 psi to about 3,500 psi, alternatively from about 300 psi to about 2,500 psi, or alternatively from about 300 psi to about 1,500 psi. The time is 28-day period after mixing the cement blend with water.

The composition can have a stable or increasing compressive strength as time increases from about 1 week to about 6 weeks, at a temperature between about 80° C./176° F. to about 180° C./356° F. in an ultrasonic cement analyzer (UCA) test when measured in accordance with test standard API-RP-10B-2.

In embodiments, the composition has a 7-day unconfined compressive strength (UCS) of from about 200 psi to about 5,000 psi at from about 20° C./68° F. to about 150° C./302° F. when measured in accordance with test standard ASTM D7012-14e1, alternatively from about 700 psi to about 5,000 psi, alternatively from about 800 psi to about 4,000 psi, alternatively from about 800 psi to about 3,000 psi, or alternatively from about 900 psi to about 3,000 psi. The unconfined compressive strength, is the maximum stress that a set composition can endure when confining pressure is zero. It can be measured using a destructive method, where the maximum stress recorded at failure is the unconfined compressive strength, also referred to as the unconfined crush strength or crush compressive strength. 7-day unconfined compressive strength can be measured after 7 days from preparation of the composition.

In embodiments, the composition has a 7-day tensile strength (TS) of from about 25 psi to about 1,000 psi at from about 20° C./68° F. to about 150° C./302° F. when measured in accordance with test standard ASTM D3967-16, alternatively from about 70 psi to about 750 psi, alternatively from about 100 psi to about 550 psi, alternatively from about 100 psi to about 500 psi, or alternatively from about 200 psi to about 500 psi. Tensile strength is also referred to as Brazilian Tensile Strength. Tensile strength is generally the capacity of a material to withstand loads tending to elongate, as opposed to compressive strength. The tensile strength of the composition may be measured at a specified time (e.g., 7 days) after the cement blend has been mixed with water and the resultant composition is maintained under specified temperature and pressure conditions. For example, tensile strength can be measured at 7 days after the composition is mixed and the composition is maintained at a temperature of from 10° C./50° F. to about 204° C./200° F. and a suitable pressure. Tensile strength may be measured using any suitable method, including without limitation in accordance with the procedure described in ASTM C307. That is, specimens may be prepared in briquette molds having the appearance of dog biscuits with a one square inch cross-sectional area at the middle. Tension may then be applied at the enlarged ends of the specimens until the specimens break at the center area. The tension in pounds per square inch at which the specimen breaks is the tensile strength of the material tested.

In embodiments, the composition has a 7-day Young's modulus (YM) of from about 2 GPa to about 14 GPa at from about 20° C./68° F. to about 150° C./302° F., alternatively from about 3 GPa to about 10 GPa, alternatively from about 3 GPa to about 9 GPa, alternatively from about 3 GPa to about 8 GPa, or alternatively from about 4 GPa to about 8 GPa. Young's modulus also referred to as the modulus of elasticity is a measure of the relationship of an applied stress to the resultant strain. In general, a highly deformable (plastic) material will exhibit a lower modulus when the confined stress is increased. Thus, the Young's modulus is an elastic constant that demonstrates the ability of the tested material to withstand applied loads. A number of different laboratory techniques may be used to measure the Young's modulus of a treatment fluid including the composition after the treatment fluid has been allowed to set for a period of time at specified temperature and pressure conditions.

In embodiments, the composition has a ratio of the 7-day tensile strength (TS) to the 7-day YM of from about 30 psi/GPa to about 75 psi/GPa at from about 20° C./68° F. to about 150° C./302° F. when measured in accordance with test standard ASTM D3967-16, alternatively from about 30 psi/GPa to about 70 psi/GPa, alternatively from about 35 psi/GPa to about 65 psi/GPa, or alternatively from about 35 psi/GPa to about 60 psi/GPa.

In embodiments, the composition has a ratio of the 7-day unconfined compressive strength (UCS) to the 7-day YM of from about 200 psi/GPa to about 500 psi/GPa at from about 68° F. to about 302° F. when measured in accordance with test standard ASTM D7012-14e1, alternatively from about 200 psi/GPa to about 480 psi/GPa, alternatively from about 240 psi/GPa to about 480 psi/GPa, or alternatively from about 280 psi/GPa to about 450 psi/GPa.

In embodiments, after setting, the composition has a permeability measured in a Hassler type core holder in accordance with test standard API-RP-10B-2. Permeability is a measure of the amount of water or other substances that can penetrate through the composition after setting. The set composition can have a permeability equal to or less than about 30 micro Darcy ($\mu D$), alternatively equal to or less than about 10 $\mu D$, alternatively equal to or less than about 6 $\mu D$, or alternatively equal to or less than about 5 $\mu D$.

28-day permeability is the permeability measured after 28 days from preparation of the composition. In embodiments, the composition has a 28-day permeability of equal to or less than about 30 $\mu D$ (micro Darcy) at from about 20° C./68° F. to about 80° C./176° F. when measured in a Hassler type core holder in accordance with test standard API-RP-10B-2, alternatively equal to or less than about 20 $\mu D$, alternatively equal to or less than about 10 $\mu D$, alternatively equal to or less than about 5 $\mu D$, alternatively equal to or less than about 4 $\mu D$, alternatively equal to or less than about 3 $\mu D$, alternatively equal to or less than about 2 $\mu D$, alternatively equal to or less than about 1 $\mu D$, or alternatively equal to or less than about 0.1 $\mu D$.

In embodiments, the composition has a 28-day permeability of equal to or less than about 30 $\mu D$ at from about 80° C./176° F. to about 150° C./302° F. when measured in a Hassler type core holder in accordance with test standard API-RP-10B-2, alternatively equal to or less than about 10 $\mu D$, alternatively equal to or less than about 5 $\mu D$, alternatively equal to or less than about 3 $\mu D$, alternatively equal to or less than about 2 $\mu D$, alternatively equal to or less than about 1 $\mu D$, or alternatively equal to or less than about 0.1 $\mu D$.

In embodiments, the composition has a yield corrected carbon footprint, also referred to as yield corrected $CO_2$ footprint, of equal to or less than about 800 kilograms of equivalent $CO_2$ per cubic meter of the composition (kg/m³), alternatively equal to or less than about 750 kg/m³, alternatively equal to or less than about 700 kg/m³, alternatively equal to or less than about 650 kg/m³, alternatively equal to or less than about 600 kg/m³, alternatively equal to or less than about 550 kg/m³, alternatively equal to or less than about 500 kg/m³, or alternatively equal to or less than about 450 kg/m³.

Carbon footprint, which refers to carbon emissions due to a material, can be determined by a cradle to grave lifecycle analysis of the material. Cradle to grave includes emissions related to production, transportation, storage, usage and disposal stages of a material. Total emissions associated with a material is the sum of emissions in each phase. Emissions can be expressed as kilograms of equivalent $CO_2$ per unit mass (or volume) of the material. There are several standards for computing the carbon emissions of a material. For example, the United States Environmental Protection Agency (EPA) publishes standards listed in the EPA's Waste Reduction Model (WARM) which allows for calculation of the carbon emissions of a material. Another source of standard is the California Air Resources Board's green house gas quantification methodology. The present disclosure uses data from certain suppliers of each component for calculating carbon footprint for materials. Where available, Environmental Product Declarations (EPD) certificates have been used. In embodiments, a dry blend comprises the cement blend and other solid components of the composition. The carbon footprint of a dry blend is calculated using Equation (1) as below:

$$\text{Carbon footprint} = \Sigma_{k=1}(\text{carbon footprint})_k x_k \quad (1)$$

wherein the dry blend comprises n components, wherein (carbon footprint)$_k$ is the carbon footprint of pure component k, and $x_k$ is the concentration of component k in the dry blend. The yield corrected carbon footprint is an estimate of carbon footprint per volume pumped for a cement slurry (e.g., the composition). A yield value of an example design of the composition can be used to calculate the consumption of the dry blend per given unit volume of the cement slurry (e.g., the composition) mixed to calculate the yield corrected carbon footprint. For example, if the yield value for a given composition (or a cement slurry) is 106 liter/100 kg, the corresponding blend requirement for 1 m$^3$ of the example composition will be 943 kg. Hence the yield correction factor for the composition's (or slurry's) $CO_2$ footprint is 0.943 versus the dry blend's $CO_2$ footprint when contribution from any liquid additives is ignored.

In some embodiments, the composition is capable to withstand a temperature in a range of from about 0° C./32° F. to about 204° C./400° F., alternatively from about 0° C./32° F. to about 191° C./375° F., alternatively from about 0° C./32° F. to about 180° C./356° F., alternatively from about 0° C./32° F. to about 163° C./325° F., or alternatively from about 0° C./32° F. to about 150° C./302° F.

A composition of the type disclosed herein can be prepared using any suitable method. In embodiments, the method comprises mixing components (e.g., Portland cement, Trass flour, an aqueous fluid) of the composition using mixing equipment (e.g., a batch mixer, a jet mixer, a re-circulating mixer, a blender, a mixing head of a solid feeding system). Mixing the components of the composition can comprise one or more steps. For example, mixing the components of the composition can comprise dry mixing components of the cement blend and optional other solid components (e.g., a weighting agent) to form a dry blend, and mixing the dry blend with an aqueous fluid and optional other additives to form a pumpable slurry (e.g., a homogeneous fluid). Any container(s) that is compatible with the components and has sufficient space can be used for mixing.

In embodiments, mixing the components of the composition can be on-the-fly (e.g., in real time or on-location). The composition can be used as a wellbore servicing fluid and be prepared at a wellsite. For example, the components of the cement blend (e.g., Portland cement, Trass flour) can be transported to the wellsite and combined (e.g., mixed/blended) with an aqueous fluid located proximate the wellsite to form the composition. The aqueous fluid can be conveyed from a source to the wellsite or be available at the wellsite prior to the combining. The cement blend can be prepared at a location remote from the wellsite and transported to the wellsite, and, if necessary, stored at the on-site location. When it is desirable to prepare the composition at the wellsite, the components of the cement blend along with additional aqueous fluid and optional other additives can be mixed to form a mixture (e.g. in a blender tub, for example mounted on a trailer). Additives can be added to the composition during preparation thereof (e.g., during mixing) and/or on-the-fly (e.g., in real time or on-location) by addition to (e.g., injection into) the composition when being pumped into the wellbore.

The method disclosed herein can further comprise introducing the composition into a subterranean formation, and allowing at least a portion of the composition to set. In embodiments, introducing the composition into the subterranean formation uses one or more pumps.

A composition of the type disclosed herein can be used as a cementitious fluid. A cementitious fluid refers to a material that can set and be used to permanently seal an annular space between casing and a wellbore wall. A cementitious fluid can also be used to seal formations to prevent loss of drilling fluid (e.g., in squeeze cementing operations) and for operations ranging from setting kick-off plugs to plug and abandonment of a wellbore. Generally, a cementitious fluid used in oil field is pumpable in relatively narrow annulus over long distances. Disclosed herein is a method of servicing a wellbore penetrating a subterranean formation. In embodiments, the method comprises placing a composition disclosed herein into the wellbore.

In embodiments, the composition is used in a subterranean workspace, for example in cementing underground pipe such as sewer pipe or wellbore casing. In embodiments, the composition is employed in primary cementing of a wellbore for the recovery of natural resources such as water or hydrocarbons. Primary cementing first involves drilling a wellbore to a desired depth such that the wellbore penetrates a subterranean formation while circulating a drilling fluid through the wellbore. Subsequent to drilling the wellbore, at least one conduit such as a casing may be placed in the wellbore while leaving a space known as the annulus (i.e., annular space) between the wall of the conduit and the wall of the wellbore. The drilling fluid may then be displaced down through the conduit and up through the annulus one or more times, for example, twice, to clean out the hole. The composition can then be conveyed (e.g., pumped) downhole and up through the annulus, thereby displacing the drilling fluid from the wellbore. In embodiments, the composition sets into a hard mass, which forms a cement column that isolates an adjacent portion of the subterranean formation and provides support to the adjacent conduit.

In some other embodiments, the composition is employed in a secondary cementing operation such as squeeze cementing, which is performed after the primary cementing operation. In squeeze cementing, the composition can be forced under pressure into permeable zones through which fluid can undesirably migrate in the wellbore. Examples of such permeable zones include fissures, cracks, fractures, streaks, flow channels, voids, high permeability streaks, annular voids, or combinations thereof. The permeable zones can be present in the cement column residing in the annulus, a wall of the conduit in the wellbore, a micro annulus between the cement column and the subterranean formation, and/or a micro annulus between the cement column and the conduit. The composition can set within the permeable zones, thereby forming a hard mass to plug those zones and prevent fluid from leaking therethrough.

An example primary cementing technique using a composition will now be described with reference to FIGS. 1 and 2. FIG. 1 illustrates surface equipment 200 that can be used in the placement of a composition in accordance with certain examples. It will be noted that while FIG. 1 generally depicts a land-based operation, the principles described herein are equally applicable to subsea operations that employ floating or sea-based platforms and rigs, without departing from the scope of the disclosure. As illustrated by FIG. 1, the surface equipment 200 can include a cementing unit 205, which can include one or more cement trucks. The cementing unit 205 can include mixing equipment 210 and pumping equipment 210. Cementing unit 205, or multiple cementing units 205, can pump a composition 14 of the type disclosed herein through a feed pipe 220 and to a cementing head 225 which conveys the composition 14 downhole. Composition 14 can displace other fluids present in the wellbore, such as drilling fluids and spacer fluids, which can exit the wellbore through an annulus and flow through pipe 235 to mud pit 240.

Figure 2:
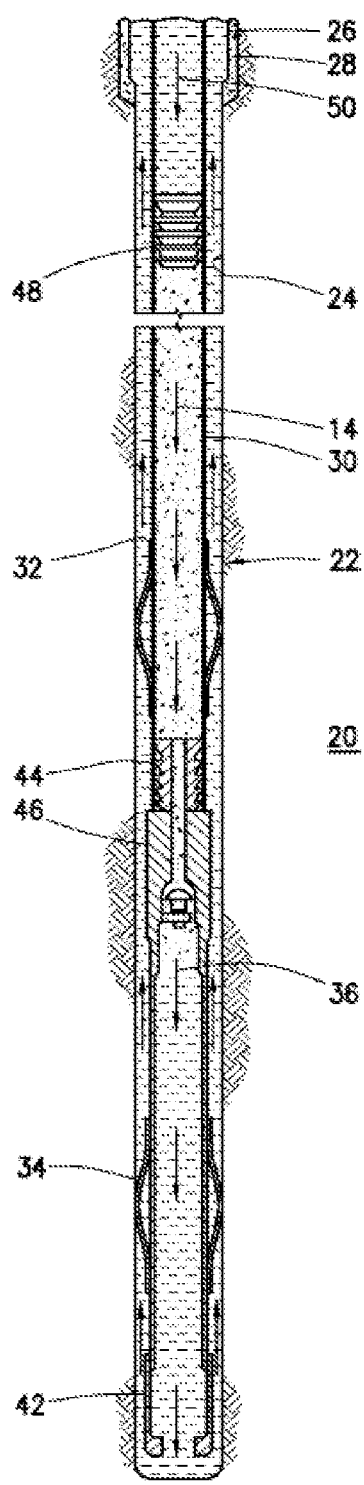
FIG. 2 is a depiction of the placement of a composition into a subterranean formation in accordance with some embodiments of the disclosure.

Referring to FIG. 2, the composition 14 can be placed into a subterranean formation 20 in accordance with example embodiments. As illustrated, a wellbore 22 can be drilled into the subterranean formation 20. While wellbore 22 is shown extending generally vertically into the subterranean formation 20, the principles described herein are also applicable to wellbores that extend at an angle through the subterranean formation 20, such as horizontal and slanted wellbores. As illustrated, the wellbore 22 comprises walls 24 of the wellbore 22. In the illustrated embodiment, a surface casing 26 has been inserted into the wellbore 22. The surface casing 26 can be cemented to the walls 24 of the wellbore 22 by cement sheath 28. In the illustrated embodiment, one or more additional conduits (e.g., intermediate casing, production casing, liners, etc.), shown here as casing 30 can also be disposed in the wellbore 22. As illustrated, there is a wellbore annulus (i.e., annular space) 32 formed between the casing 30 and the walls 24 of the wellbore 22 and/or the surface casing 26. One or more centralizers 34 can be attached to the casing 30, for example, to centralize the casing 30 in the wellbore 22 prior to and during the cementing operation.

With continued reference to FIG. 2, the composition 14 can be placed (e.g., pumped) down the interior of the casing 30. The composition 14 can be allowed to flow down the interior of the casing 30 through the casing shoe 42 at the bottom of the casing 30 and up around the casing 30 into the wellbore annulus 32. The composition 14 can be allowed to set in the wellbore annulus 32, for example, to form a cement sheath that supports and positions the casing 30 in the wellbore 22. Other techniques can also be utilized for introduction of the composition 14. By way of example, reverse circulation techniques can be used that includes introducing the composition 14 into the subterranean formation 20 by way of the wellbore annulus 32 instead of through the casing 30. In such embodiments, the method comprises circulating the composition 14 down through the wellbore annulus 32 and back up through the interior of the casing 30.

In embodiments, the composition 14 displaces other fluids 36, such as drilling fluids and/or spacer fluids that can be present in the interior of the casing 30 and/or the wellbore annulus 32. At least a portion of the displaced fluids 36 can exit the wellbore annulus 32 via a flow line and be deposited, for example, in one or more retention pits (e.g., a mud pit 240 in FIG. 1). A bottom plug 44 can be introduced into the wellbore 22 ahead of the composition 14, for example, to separate the composition 14 from the fluids 36 that can be inside the casing 30 prior to cementing. After the bottom plug 44 reaches the landing collar 46, a diaphragm or other suitable device can rupture to allow the composition 14 through the bottom plug 44. In FIG. 2, the bottom plug 44 is shown on the landing collar 46. In the illustrated embodiment, a top plug 48 can be introduced into the wellbore 22 behind the composition 14. The top plug 48 can separate the composition 14 from a displacement fluid 50 and also push the composition 14 through the bottom plug 44.

In embodiments, the method disclosed herein further comprises circulating the composition down through a conduit (e.g., casing) and back up through an annular space (also referred to as an annulus or a wellbore annulus) between an outside wall of the conduit and a wall of the wellbore. In some other embodiments, the method disclosed herein further comprises circulating the composition down through an annular space between an outside wall of a conduit and a wall of the wellbore and back up through the conduit. The method can further comprise allowing the composition to form a set cement. In embodiments, the set cement has a positive expansion. In other words, the set cement does not shrink in volume. An expansion rate of the set cement can be from 0 to about 10%, alternatively from 0 to about 5%, alternatively from 0 to about 2%, alternatively from 0 to about 1%, or alternatively from 0 to about 0.5%. In some embodiments, the set cement has a permeability of from about 0.01 μD to about 30 μD, alternatively from about 0.01 μD to about 10 μD, or alternatively from about 0.01 μD to about 6 μD.

Disclosed herein is a method of servicing a wellbore penetrating a subterranean formation. The method can comprise placing a composition of the type disclosed herein into the wellbore, and allowing at least a portion of the composition to set. Also disclosed herein is a method of servicing a wellbore with a conduit (e.g., casing, production tubing, tubular, or other mechanical conveyance, etc.) disposed therein to form an annular space between a wellbore wall and an outer surface of the conduit. In embodiments, the method comprises placing a composition of the type disclosed herein into at least a portion of the annular space, and allowing at least a portion of the composition to set.

In the method disclosed herein, placing a composition into at least a portion of the annular space can be in different directions. In some embodiments, placing the composition comprises circulating the composition down through the conduit and back up through the annular space. In some other embodiments, placing the composition comprises circulating the composition down through the annular space and back up through the conduit. In embodiments, the conduit comprises casing.

Various benefits may be realized by utilization of the presently disclosed methods and compositions. The composition as disclosed herein can develop suitable mechanical properties and permeability after setting and has a relatively low carbon footprint. The composition can also be expansive and thus avoid forming flow channels after setting of the composition.

EXAMPLES

The embodiments having been generally described, the following examples are given as particular embodiments of the disclosure and to demonstrate the practice and advantages thereof. It is understood that the examples are given by way of illustration and are not intended to limit the specification or the claims in any manner.

Example 1

Three cement blends were prepared according to compositions in Table 1. Two compositions were prepared per API procedures with each cement blend by mixing the cement blend with water, without and with accelerator (sodium sulfate and/or sodium chloride), and were named "Blend x (without accelerator)" and "Blend x (with accelerator)", respectively, wherein x is the number of the cement blend. The wt. % is the weight percentage of a component in a cement blend. The density of the six compositions were 1,600 kg/m³.

TABLE 1

Cement blend composition

| Cement blend | Unit | Blend 1 Without accelerator | Blend 1 With accelerator | Blend 2 Without accelerator | Blend 2 With accelerator | Blend 3 Without accelerator | Blend 3 With accelerator |
|---|---|---|---|---|---|---|---|
| Cementitious material | wt. % | 45 | 45 | 45 | 45 | 45 | 45 |
| Aplite | wt. % | 15 | 15 | 25 | 25 | 35 | 35 |
| Pozzolanic material | wt. % | 35 | 35 | 25 | 25 | 15 | 15 |
| Silica fume | wt. % | 5 | 5 | 5 | 5 | 5 | 5 |
| Accelerator | % BWOB | | 1 | | 1 | | 1 |

Figure 3A:
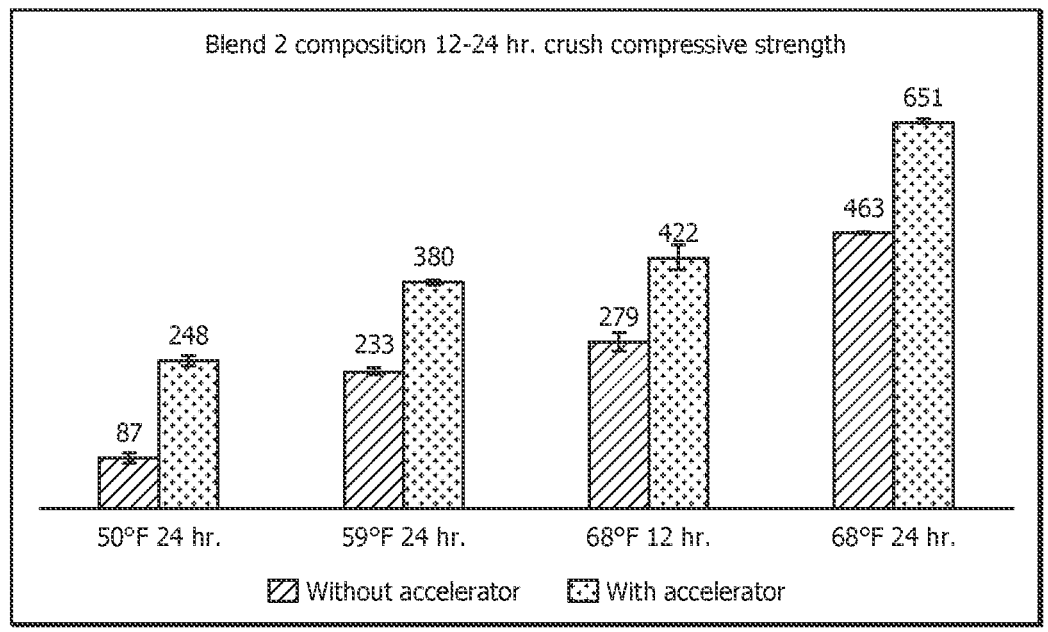
FIG. 3A is a bar chart comparing crush strength of some samples in accordance with some embodiments of the disclosure with and without accelerator.

12-to-24-hour compressive strength of Blend 2 (without accelerator and with accelerator) were measured at different temperatures in accordance with test standard API-RP-10B-2. Results in FIG. 3A shows that the compressive strength increased as the temperature increased for the same blend; Blend 2 (with accelerator) had greater compressive strength than Blend 2 (without accelerator); for the same sample at the same temperature, 24-hour compressive strength was greater than 12-hour compressive strength; and for the same blend and temperature, the composition with accelerator had a greater 24-hour compressive strength than without accelerator.

Figure 3B:
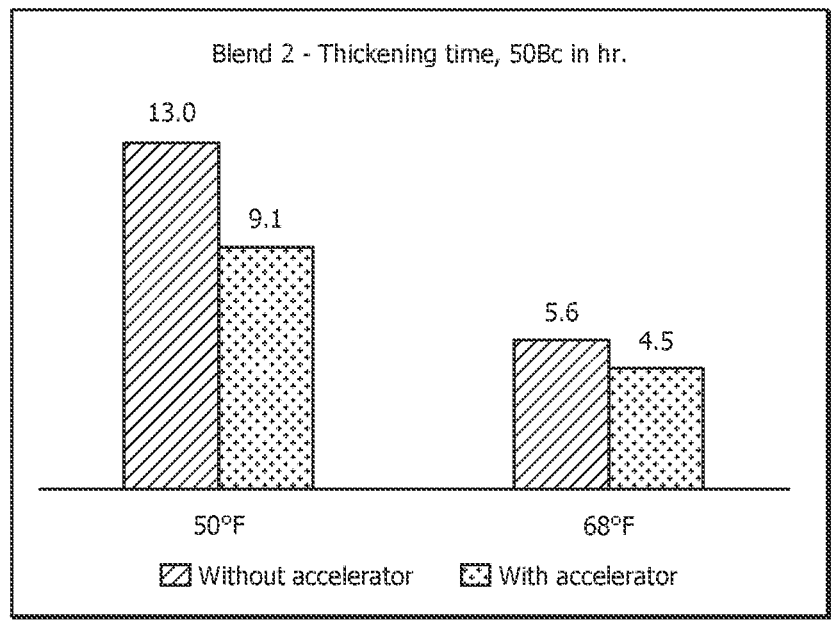
FIG. 3B is a bar chart comparing thickening time of some samples in accordance with some embodiments of the disclosure with and without accelerator.

Thickening time of Blend 2 (without accelerator and with accelerator) at different temperatures was measured in accordance with test standard API-RP-10B-2. Results in FIG. 3B shows that thickening time decreased as the temperature increased, and Blend 2 (with accelerator) had a shorter thickening time than Blend 2 (without accelerator).

Figure 3C:
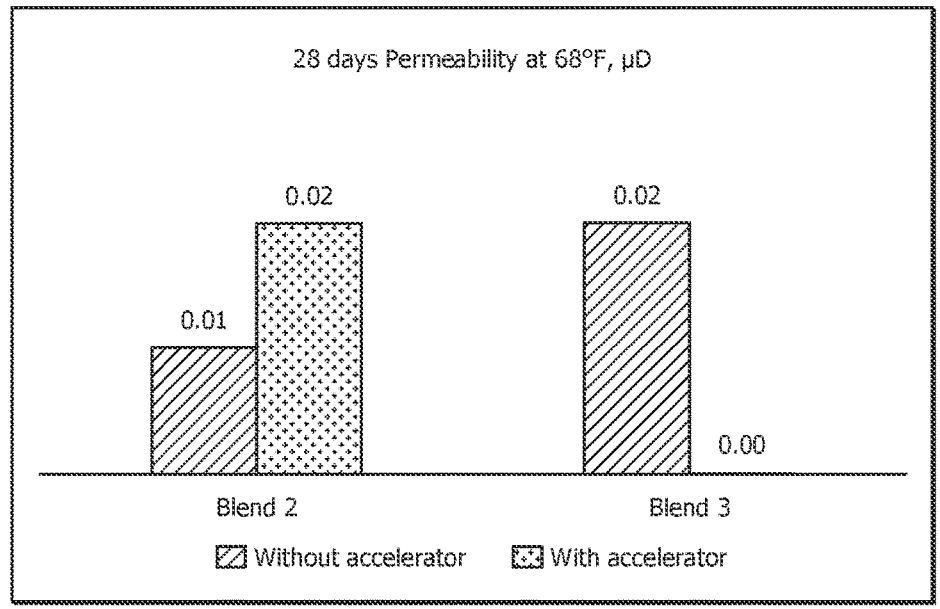
FIG. 3C is a bar chart comparing the 28-day permeability of some samples in accordance with some embodiments of the disclosure.

28-day permeability of Blend 2 (without accelerator and with accelerator) and Blend 3 (without accelerator and with accelerator) at 20° C./68° F. was measured in a Hassler type core holder in accordance with test standard API-RP-10B-2. Results in FIG. 3C are in μD (micro Darcy) and shows that all the samples had a 28-day permeability equal to or lower than 0.02 μD.

Figure 3D:
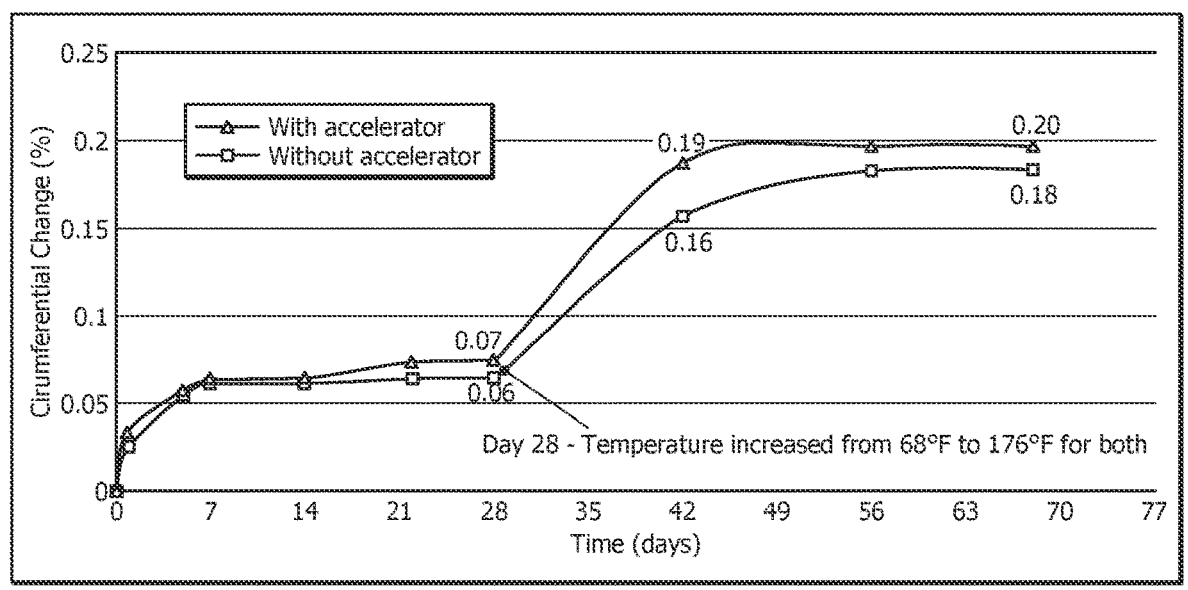
FIG. 3D is a graph showing results of ring expansion test as function of time of some samples in accordance with some embodiments of the disclosure.

A ring expansion test was run for Blend 2 (without accelerator and with accelerator). After running the test for given number of days, the ring molds were measured and the percentage of expansion of each sample was calculated according to the procedure and equations in API 10B-5 on Determination of shrinkage or expansion under conditions of free access of water at atmospheric pressure—Anmlar ring test. The temperature was increased from 20° C./68° F. to 80° C./176° F. on day 28 to accelerate the reaction and determine the ultimate plateau. FIG. 3D shows ring expansion test results for Blend 2 (without accelerator and with accelerator) at 20° C./68° F. (0 to 28 days) and 80° C./176° F. (after 28 days). After 7 days, the circumferential change was greater than 0.05%; and after 42 days (14 days at 80° C./176° F.), the circumferential change was greater than 0.15%. Blend 2 (with accelerator) had equal to or greater circumferential change than Blend 2 (without accelerator) at the same time.

Figure 3E:
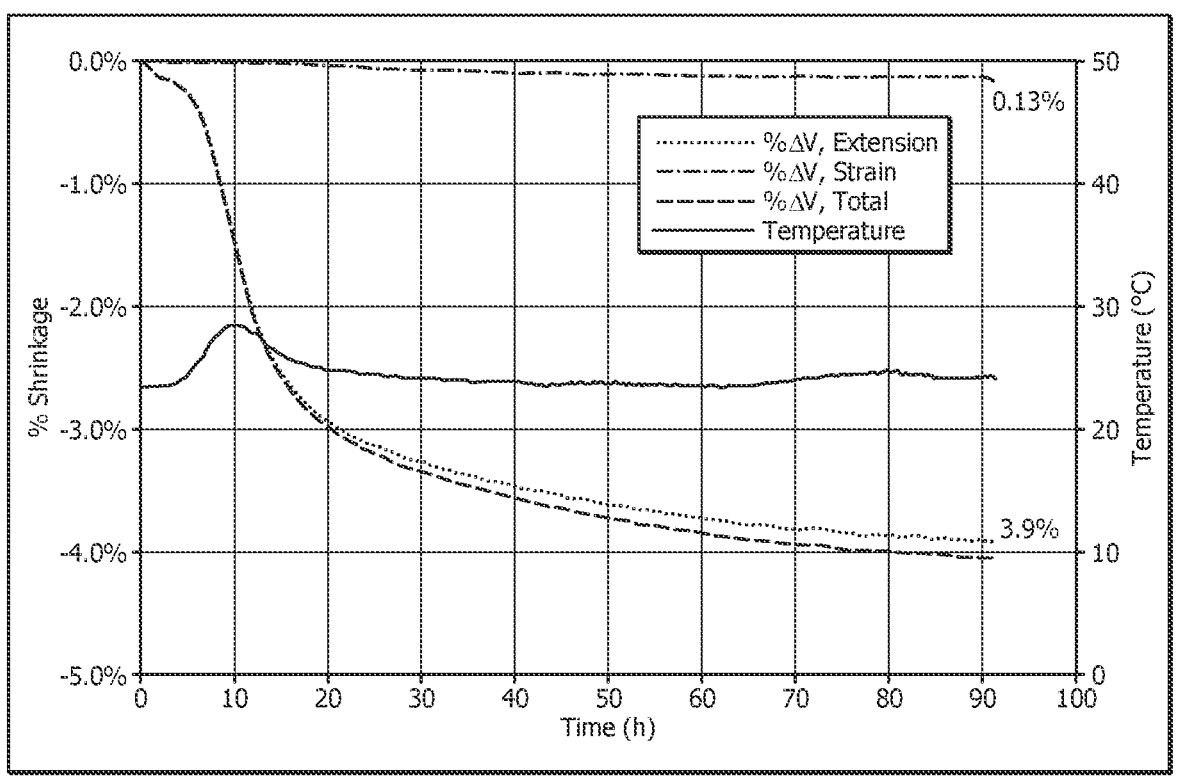
FIG. 3E is a graph of hydration shrinkage of a standard class G based cement in a volumetric shrinkage test setup.
Figure 4A:
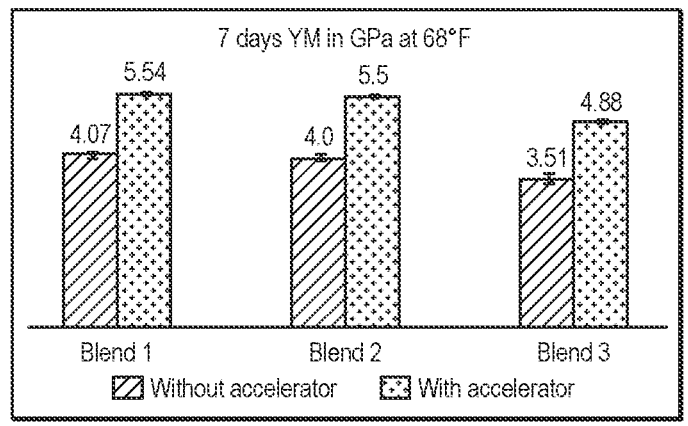
FIGS. 4A-4E are bar charts comparing 7-day curing at 20° C./68° F. mechanical properties of some samples in accordance with some embodiments of the disclosure. The mechanical properties include unconfined compressive strength, tensile strength, Young's Modulus of elasticity, and the ratios of tensile strength/Young's modulus, and unconfined compressive strength/Young's Modulus.
Figure 4B:
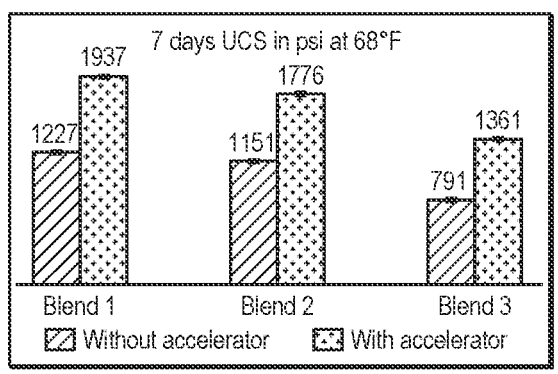
Figure 4C:
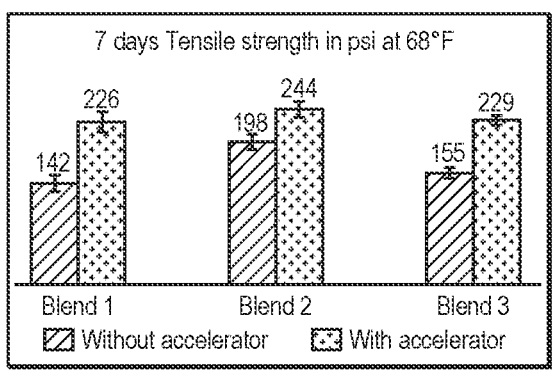
Figure 4D:
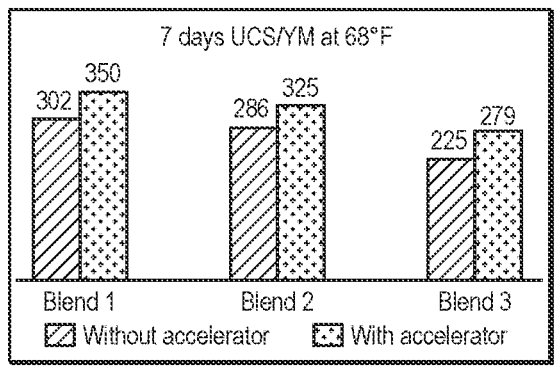
Figure 4E:
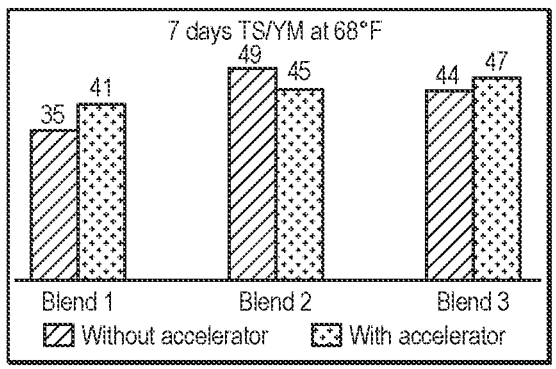

FIG. 3E shows typical hydration shrinkage of a standard class G based cement in a volumetric shrinkage test at 20° C./68° F. for comparison. A standard class G based cement showed no expansion but shrinkage during the test.

Experiments and calculations were also performed to Blends 1-3 (without accelerator and with accelerator) for 7-day mechanical properties at 20° C./68° F. in accordance with test standards ASTM D7012-14e1 and ASTM D3967-16. 7-day mechanical properties included 7-day unconfined compressive strength (UCS), tensile strength (TS), Young's modulus (YM), TS/YM, and UCS/YM. The results in FIGS. 4A-4E demonstrated that Blends 1-3 (without accelerator and with accelerator) could develop suitable 7-day mechanical properties (e.g., a UCS greater than 700 psi, a TS greater than 100 psi, and a YM greater than 3 GPa) with and without accelerator. Based on these results, Blend 2 (without accelerator and with accelerator) was optimum among Blends 1-3 (without accelerator and with accelerator).

Example 2

Cement blends 4-9 were prepared according to compositions in Table 2. Compositions were prepared per API procedures with each of the cement blends by mixing the cement blend with water, with and/or without a salt (sodium sulfate and/or sodium chloride), and were named "Blend x (without accelerator)" and "Blend x (with accelerator)", respectively, wherein x is the number of the cement blend. The wt. % is the weight percentage of a component in a cement blend. Blends 6 (without accelerator), 8 (without accelerator), and 9 (without accelerator) had the same cement blend with different densities.

TABLE 2

Cement blend composition

| Cement blend | Unit | Blend 4 Without accelerator | Blend 4 With accelerator | Blend 5 Without accelerator | Blend 5 With accelerator | Blend 6 Without accelerator | Blend 6 With accelerator | Blend 7 Without accelerator | Blend 7 With accelerator | Blend 8 Without accelerator | Blend 9 Without accelerator |
|---|---|---|---|---|---|---|---|---|---|---|---|
| Cementitious material | wt. % | 45 | 45 | 45 | 45 | 45 | 45 | 45 | 45 | 45 | 45 |
| Aplite | wt. % | 50 | 50 | 35 | 35 | 25 | 25 | 15 | 15 | 25 | 25 |
| Pozzolanic material | wt. % | 0 | 0 | 15 | 15 | 25 | 25 | 35 | 35 | 25 | 25 |

TABLE 2-continued

Cement blend composition

| Cement blend | Unit | Blend 4 | | Blend 5 | | Blend 6 | | Blend 7 | | Blend 8 | Blend 9 |
|---|---|---|---|---|---|---|---|---|---|---|---|
| | | Without accelerator | With accelerator | Without accelerator | With accelerator | Without accelerator | With accelerator | Without accelerator | With accelerator | Without accelerator | Without accelerator |
| Silica fume | wt. % | 5 | 5 | 5 | 5 | 5 | 5 | 5 | 5 | 5 | 5 |
| Accelerator | % BWOB | — | 1 | — | 1 | — | 1 | — | 1 | — | — |
| Density | kg/m³ | 1,700 | 1,700 | 1,700 | 1,700 | 1,700 | 1,700 | 1,700 | 1,700 | 1,800 | 1,900 |

Figure 5A:
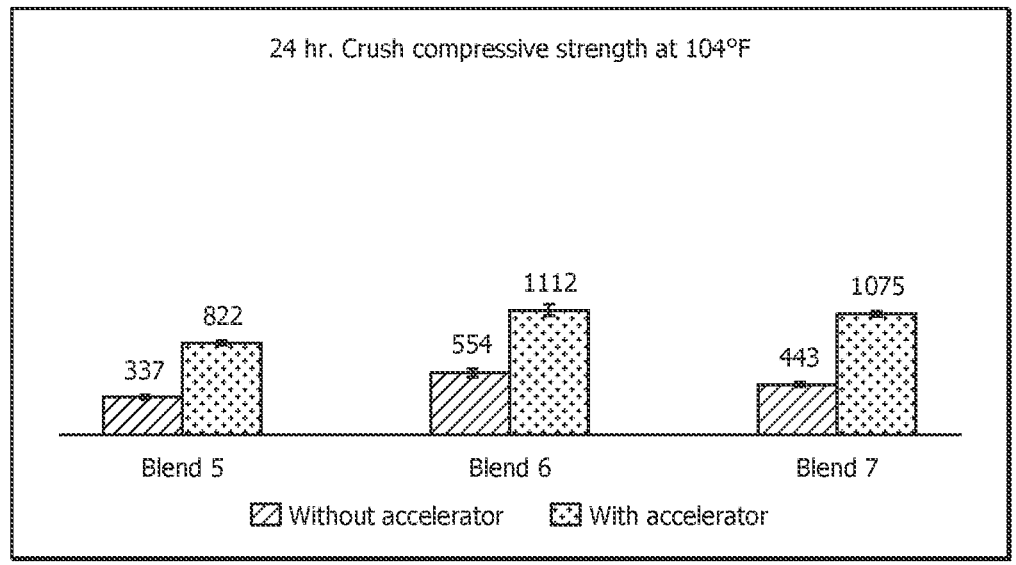
FIGS. 5A-5B are bar charts comparing 24-hour crush compressive strength of some samples in accordance with some embodiments of the disclosure with and without accelerator.
Figure 5B:
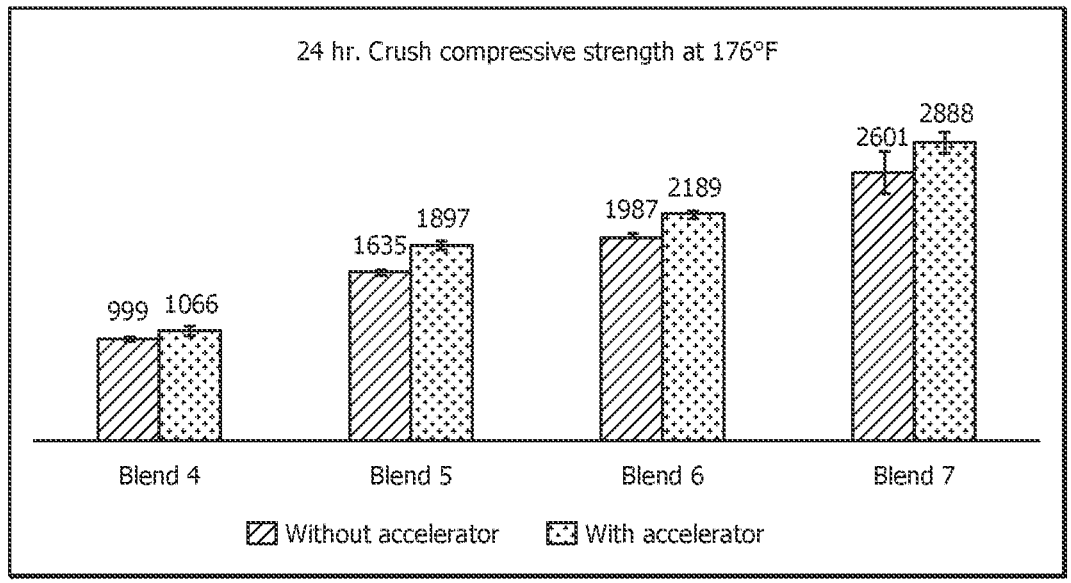

24-hour crush compressive strength of Blends 4-7 (without accelerator and with accelerator) were measured at different temperatures in accordance with test standard API-RP-10B-2. Results in FIGS. 5A and 5B shows that the 24-hour crush compressive strength increased as the temperature increased for the same blend, 24-hour crush compressive strength increased as the pozzolanic material content increased, and for the same blend and temperature the composition with accelerator had a greater 24-hour crush compressive strength than the composition without accelerator.

Figure 5C:
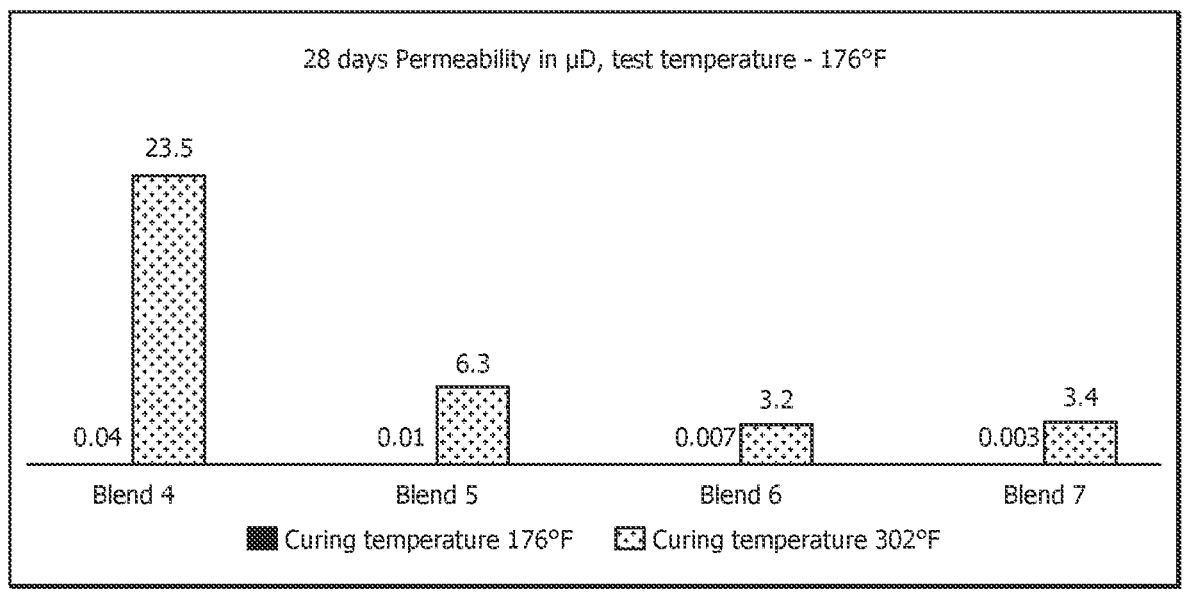
FIG. 5C is a bar chart comparing 28-day permeability of some samples in accordance with some embodiments of the disclosure.

28-day permeability of Blends 4-7 (without accelerator) at 80° C./176° F. and 150° C./302° F. was measured in a Hassler type core holder in accordance with test standard API-RP-10B-2. Results in FIG. 5C shows that at 80° C./176° F. all the samples had a 28-day permeability equal to or lower than 0.01 µD, at 150° C./302° F. Blends 6-7 (without accelerator) had a 28-day permeability equal to or lower than 4 µD.

Figure 5D:
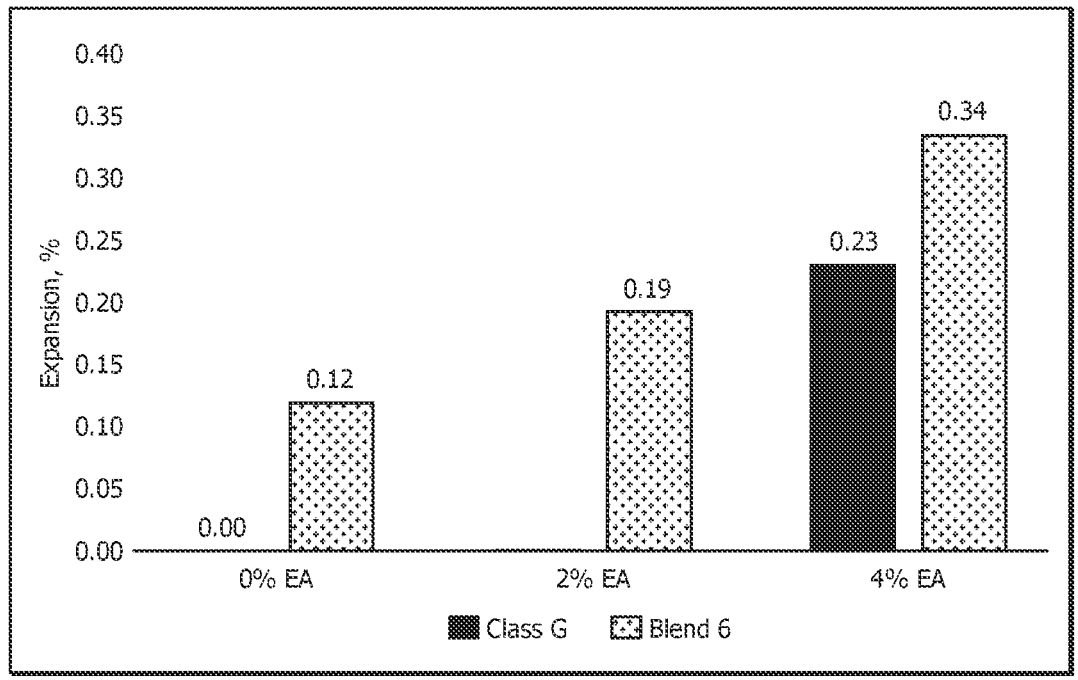
FIGS. 5D-5E are graphs presenting ring expansion test results of some samples in accordance with some embodiments of the disclosure.
Figure 5E:
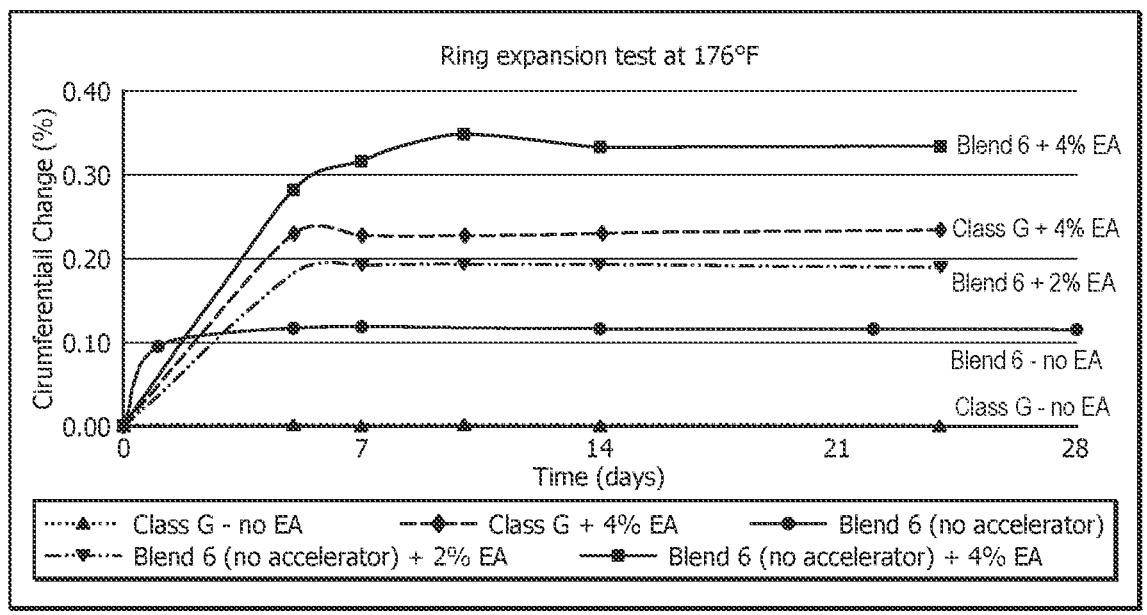

A ring expansion test was conducted at 80° C./176° F. for Blend 6 (without accelerator) with no expansion additive (EA), 2% EA, and 4% EA BWOB according to the procedures as in Example 1. For comparison, basic class G cement based samples with no EA and 4% EA mixed at 1.70 specific gravity were tested in parallel. FIGS. 5D and 5E show the 14-day ring expansion test results. After 14 days from preparation, the circumferential change of Blend 6 (without accelerator) with no EA, 2% EA, and 4% EA were from about 0.12% to about 0.34%. Increasing the EA amount in Blend 6 (without accelerator) increased the circumferential change. Basic class G cement based samples had no circumferential increase (reduction was not measured) with no EA. Blend 6 (without accelerator) with no EA, 2% EA, and 4% EA had greater expansion than the corresponding basic class G cement based samples at the same temperature.

Figure 5F:
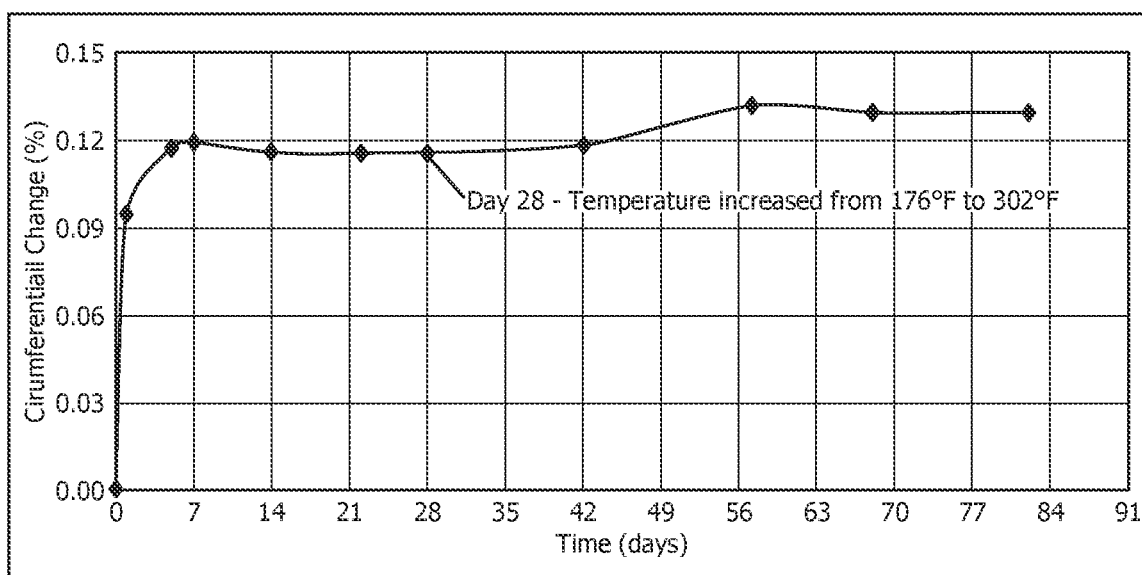
FIG. 5F is a graph of long-term ring expansion test results of a sample in accordance with some embodiments of the disclosure.
Figure 6A:
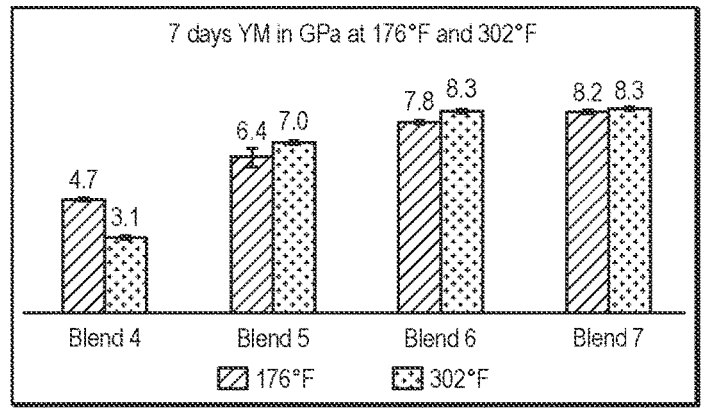
FIGS. 6A-6E are bar charts comparing 7-day curing at 80° C./176° F. and 150° C./302° F. mechanical properties of some samples in accordance with some embodiments of the disclosure. The mechanical properties include unconfined compressive strength, tensile strength, Young's Modulus of elasticity, and the ratios of tensile strength/Young's modulus, and unconfined compressive strength/Young's Modulus.
Figure 6B:
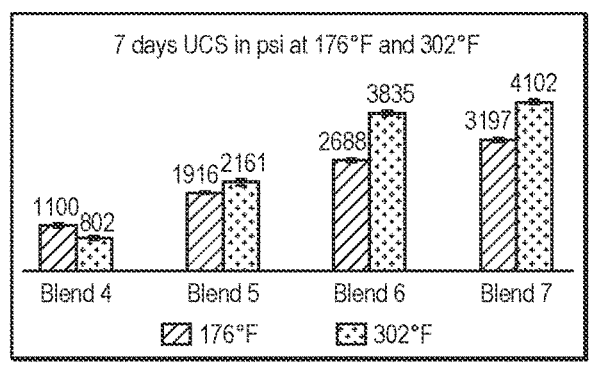
Figure 6C:
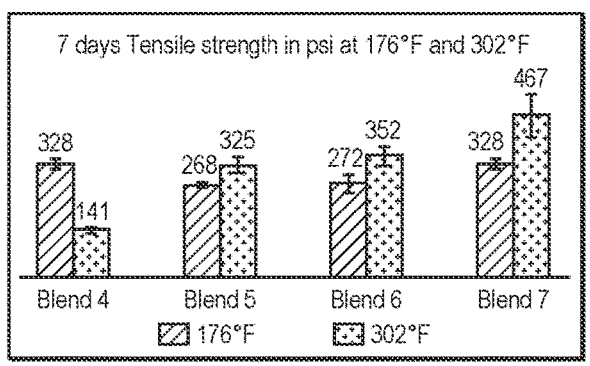
Figure 6D:
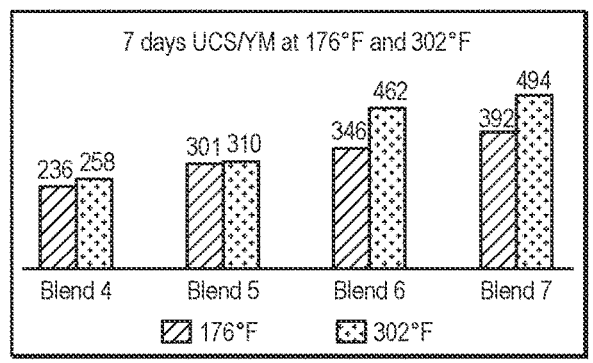
Figure 6E:
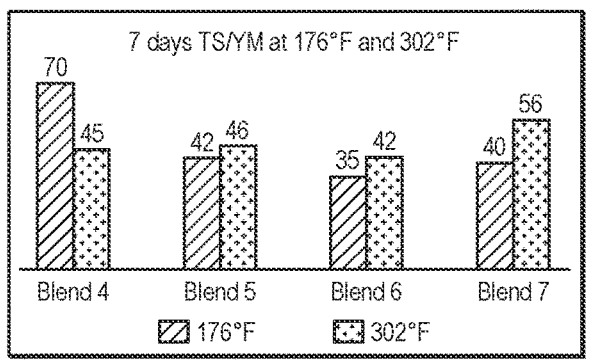

FIG. 5F shows the ring expansion test results of Blend 6 (without accelerator) with no EA at 176° F. for a longer term. On day 28, the temperature was increased to 150° C./302° F. and the circumferential change was from about 0.12% to about 0.14%.

Similar as Example 1, experiments and calculations were performed to Blends 4-7 (without accelerator) for 7-day mechanical properties at 80° C./176° F. and 150° C./302° F. in accordance with ASTM D7012-14e1 and ASTM D3967-16. The results in FIGS. 6A-6E demonstrated that Blends 4-7 (without accelerator) could develop suitable 7-day mechanical properties (e.g., a UCS greater than 700 psi, a TS greater than 100 psi, and a YM greater than 3 GPa) at the two temperatures. As the temperature increased, compressive strength, tensile strength, and Young's modulus increased. Based on these results, Blend 6 (without accelerator) was optimum among Blends 4-7 (without accelerator).

Example 3

Figure 7:
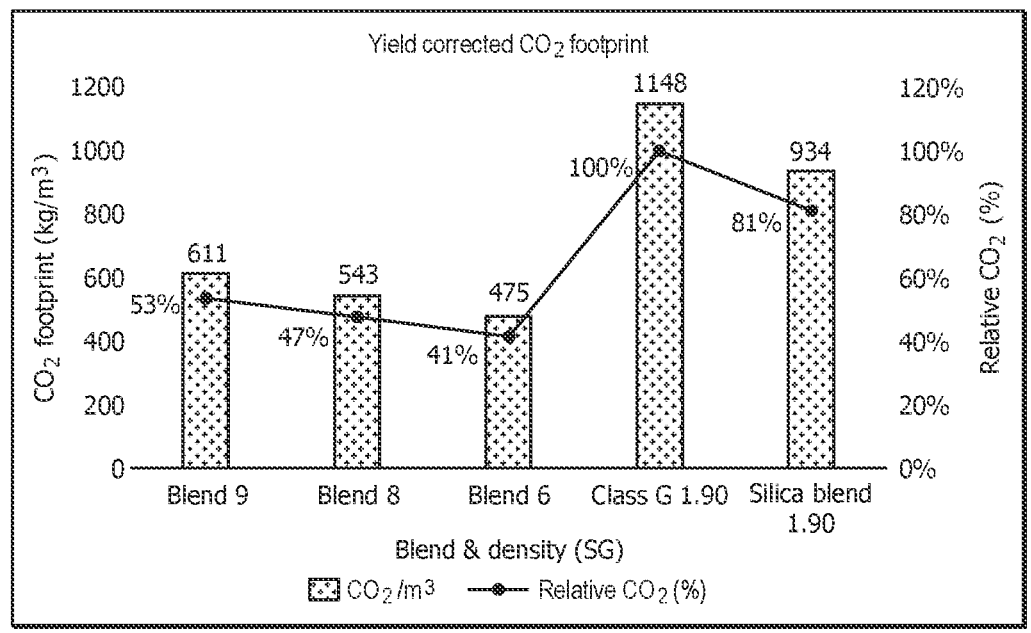
FIG. 7 is a bar chart comparing the estimated yield corrected (per $m^3$ cement slurry) carbon footprint of some samples in accordance with some embodiments of the disclosure.

Yield corrected carbon footprint was calculated for Blend 6 (without accelerator), Blend 8 (without accelerator), and Blend 9 (without accelerator) in Table 2, as well as for a class G cement based sample (specific gravity or SG=1.90) and a silica based sample (SG=1.90). The results are shown in FIG. 7. The term "yield correction" means that the carbon footprint of the blend has been used in combination with the yield factor of the subject slurry design to calculate the carbon footprint per m³ volume of the cement slurry, for comparison purpose, as the blend $CO_2$ footprint in itself is not a suitable comparison.

According to the results of Blends 6 (without accelerator), 8 (without accelerator), and 9 (without accelerator) in FIG. 7, lower density (or SG) of a cement slurry generally increased the yield factor and thus reduced the yield corrected carbon footprint for the same blend. Therefore, lower the density (or SG) of a cement slurry can lower the yield corrected carbon footprint while meeting design criteria.

Example 4

Figure 8:
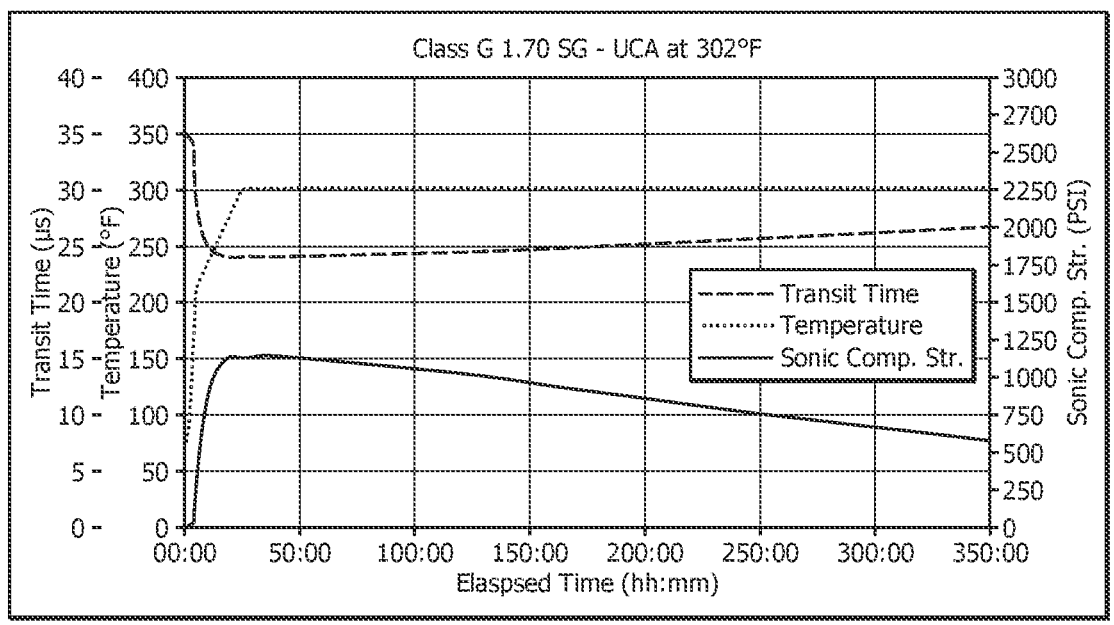
FIG. 8 is an ultrasonic cement analyzer (UCA) chart of a class G cement based sample.
Figure 9A:
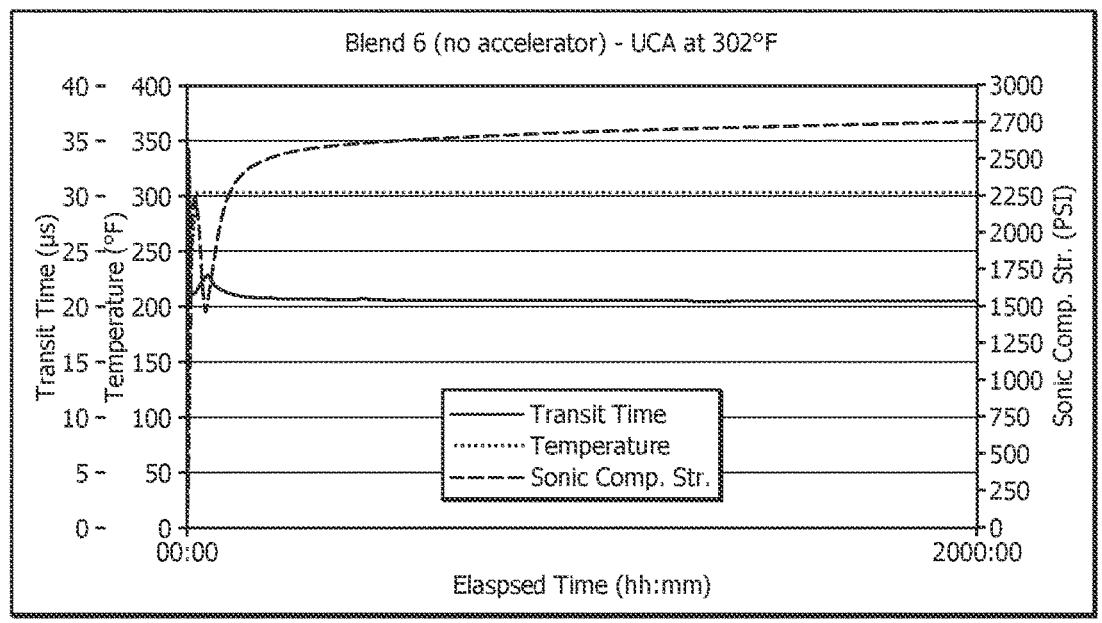
FIG. 9A-9B are UCA charts of a sample at 150° C./302° F. and 180° C./356° F. in accordance with some embodiments of the disclosure.
Figure 9B:
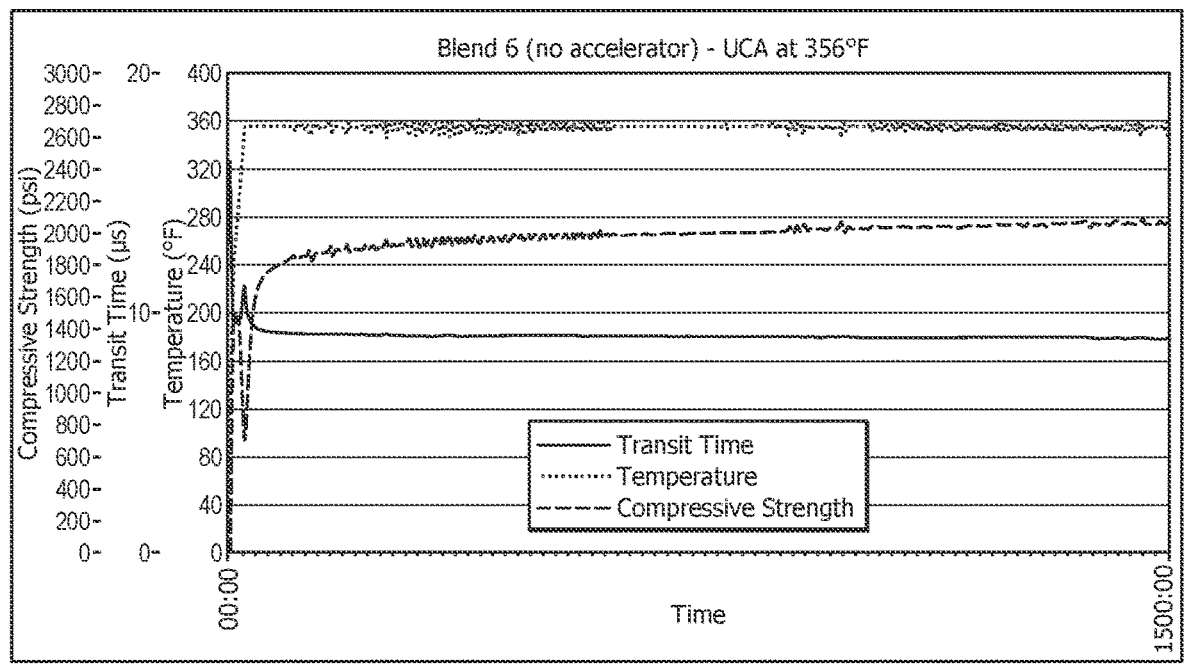

Ultrasonic cement analyzer (UCA) test was conducted to measure compressive strength after preparation of cement slurry samples. FIG. 8 shows a UCA chart of a class G cement based sample (SG=1.70) at 150° C./302° F., where the compressive strength decreased as time increased (i.e., strength retrogression) from the 2nd day of the experiment. Sonic strength is a measure of compressive strength based on "transit time" of soundwaves through the cement. The sonic strength is an indicator of crush compressive strength and is often used to monitor compressive strength versus time. FIG. 9A shows an 83-day UCA chart of Blend 6 (without accelerator) at the same condition without strength retrogression. FIG. 9B shows a 62-day UCA chart of Blend 6 (without accelerator) at 180° C./356° F. without strength retrogression. This demonstrates that at 150° C./302° F. and 180° C./356° F., strength retrogression can be avoided for Blend 6 (without accelerator).

ADDITIONAL DISCLOSURE

The following is provided as additional disclosure for combinations of features and embodiments of the present disclosure.

A first embodiment, which is a composition comprising a cementitious material, a pozzolanic material, aplite, and an aqueous fluid.

A second embodiment, which is the composition of the first embodiment, wherein the cementitious material comprises a Portland cement.

A third embodiment, which is the composition of the first embodiment, wherein the pozzolanic material comprises a material selected from the group consisting of Trass flour, recycled glass, fly ash, bottom ash, cenospheres, glass bubbles, slag, clays, calcined clays, partially calcined clays, kaolinite clays, lateritic clays, illite clays, crystalline silica, silica flour, cement kiln dust, volcanic rock, natural pozzolans, mine tailings, diatomaceous earth, zeolite, shale, ground vitrified pipe, agricultural waste ash, ground granulated blast furnace slag, bentonite, pumice, and any combination thereof.

A fourth embodiment, which is the composition of the second embodiment, wherein the pozzolanic material comprises a material selected from the group consisting of Trass flour, recycled glass, fly ash, bottom ash, cenospheres, glass bubbles, slag, clays, calcined clays, partially calcined clays, kaolinite clays, lateritic clays, illite clays, crystalline silica, silica flour, cement kiln dust, volcanic rock, natural pozzolans, mine tailings, diatomaceous earth, zeolite, shale, ground vitrified pipe, agricultural waste ash, ground granulated blast furnace slag, bentonite, pumice, and any combination thereof.

A fifth embodiment, which is the composition of the first embodiment, wherein the aplite comprises granite and the pozzolanic material comprises Trass flour.

A sixth embodiment, which is the composition of the second embodiment, wherein the aplite comprises granite and the pozzolanic material comprises Trass flour.

A seventh embodiment, which is the composition of the second embodiment, wherein the aplite comprises granite and the pozzolanic material comprises pumice.

An eighth embodiment, which is the composition of the second embodiment, wherein the aplite comprises granite and the pozzolanic material comprises calcined clay.

A ninth embodiment, which is the composition of the second embodiment, wherein the aplite comprises granite and the pozzolanic material comprises ground granulated blast furnace slag.

A tenth embodiment, which is the composition of the second embodiment, wherein the aplite comprises granite and the pozzolanic material comprises fly ash.

An eleventh embodiment, which is the composition of the second embodiment, wherein the aplite comprises granite and the pozzolanic material comprises bentonite.

A twelfth embodiment, which is the composition of the first embodiment, further comprising silica fume.

A thirteenth embodiment, which is the composition of the second embodiment, further comprising silica fume.

A fourteenth embodiment, which is the composition of the fifth embodiment, further comprising silica fume.

A fifteenth embodiment, which is the composition of the sixth embodiment, further comprising silica fume.

A sixteenth embodiment, which is the composition of the first embodiment, further comprising a sodium chloride and sodium sulfate blend.

A seventeenth embodiment, which is the composition of the second embodiment, further comprising a sodium chloride and sodium sulfate blend.

An eighteenth embodiment, which is the composition of the fifth embodiment, further comprising a sodium chloride and sodium sulfate blend.

A nineteenth embodiment, which is the composition of the sixth embodiment, further comprising a sodium chloride and sodium sulfate blend.

A twentieth embodiment, which is the composition of the twelfth embodiment, further comprising a sodium chloride and sodium sulfate blend.

A twenty-first embodiment, which is the composition of the thirteenth embodiment, further comprising a sodium chloride and sodium sulfate blend.

A twenty-second embodiment, which is the composition of the fourteenth embodiment, further comprising a sodium chloride and sodium sulfate blend.

A twenty-third embodiment, which is the composition of the fifteenth embodiment, further comprising a sodium chloride and sodium sulfate blend.

A twenty-fourth embodiment, which is the composition of any of the first through the twenty-third embodiments, wherein: (i) the cementitious material is present in the composition in an amount ranging from about 1 to about 90 weight percent by weight of blend (BWOB); (ii) the pozzolanic material is present in the composition in an amount ranging from about 1 to about 90 weight percent BWOB; (iii) the aplite is present in the composition in an amount ranging from about 1 to about 90 weight percent BWOB; (iv) the silica fume is present in the composition in an amount ranging from about 0.5 to about 50 weight percent BWOB; (v) the sodium chloride is present in the composition in an amount ranging from about 0.01 to about 10 weight percent BWOB; (vi) the sodium sulfate is present in the composition in an amount ranging from about 0.01 to about 10 weight percent BWOB; and (vii) the aqueous fluid is present in an amount effective to form a pumpable slurry of the composition.

A twenty-fifth embodiment, which is the composition of any of the first through the twenty-fourth embodiments, excluding an expansion additive.

A twenty-sixth embodiment, which is a composition comprising: (i) Portland cement in an amount ranging from about 1 to about 90 weight percent BWOB; (ii) Trass flour in an amount ranging from about 1 to about 90 weight percent BWOB; (iii) granite in an amount ranging from about 1 to about 90 weight percent BWOB; and (iv) aqueous fluid in an amount effective to form a pumpable slurry of the composition.

A twenty-seventh embodiment, which is the composition of the twenty-sixth embodiment, further comprising (v) silica fume in an amount ranging from about 0.5 to about 50 weight percent BWOB.

A twenty-eighth embodiment, which is the composition of the twenty-sixth or the twenty-seventh embodiment, further comprising (vi) sodium chloride in an amount ranging from about 0.01 to about 10 weight percent BWOB; and (vii) sodium sulfate is present in the composition in an amount ranging from about 0.1 to about 10 weight percent BWOB.

A twenty-ninth embodiment, which is a method of servicing a wellbore penetrating a subterranean formation, comprising: placing a composition of claim 1 into the wellbore; and allowing the composition to form a set cement.

A thirtieth embodiment, which is the method of the twenty-ninth embodiment, wherein the set cement has a positive expansion.

A thirty-first embodiment, which is the method of the twenty-ninth or the thirtieth embodiment, wherein the set cement has a permeability of from about 0.01 micro Darcy (µD) to about 30 µD.

A thirty-second embodiment, which is the composition of any of the third through the thirty-first embodiments, wherein the Trass flour has a d50 particle size distribution of equal to or less than about 50 microns.

A thirty-third embodiment, which is the composition of any of the first through the thirty-second embodiments, further comprising a pre-blended stabilizing agent.

A thirty-fourth embodiment, which is the composition of the thirty-third embodiment, wherein the pre-blended stabilizing agent comprises bentonite, sepiolite, attapulgite, water swellable synthetic clays, Diutan gum, xanthan gum, wellan gum, guar gum, modified guar gum, hydroxy ethyl cellulose, modified cellulose, other classes of polysaccharides, or combinations thereof.

A thirty-fifth embodiment, which is the composition of the thirty-third or the thirty-fourth embodiment, wherein the pre-blended stabilizing agent are present in the composition in an amount of from about 0.01% BWOB to about 10% BWOB.

A thirty-sixth embodiment, which is the composition of any of the first through the thirty-fifth embodiments, further comprising one or more additives.

A thirty-seventh embodiment, which is the composition of the thirty-sixth embodiment, wherein the one or more additives comprise weighting agents, retarders, accelerators, activators, gas migration control additives, lightweight additives, gas-generating additives, mechanical-property-enhancing additives (e.g., carbon fibers, glass fibers, metal fibers, minerals fibers, polymeric elastomers, latexes, etc.), lost-circulation materials, filtration-control additives, fluid-loss-control additives, defoaming agents, foaming agents, transition time modifiers, dispersants, thixotropic additives, suspending agents, or combinations thereof.

A thirty-eighth embodiment, which is the composition of the thirty-sixth or the thirty-seventh embodiment, wherein the one or more additives are present in the composition in an amount of from about 0.01% BWOB to about 50% BWOB based on the total weight of the cement blend.

A thirty-ninth embodiment, which is a method of preparing a composition of any of the first through the thirty-eighth embodiments, comprising: mixing components of the composition using mixing equipment.

A fortieth embodiment, which is the method of any of the twenty-ninth through the thirty-first embodiments, further comprising circulating the composition down through a conduit and back up through an annular space between an outside wall of the conduit and a wall of the wellbore.

A forty-first embodiment, which is the method of any of the twenty-ninth through the thirty-first embodiments, further comprising circulating the composition down through an annular space between an outside wall of a conduit and a wall of the wellbore and back up through the conduit.

A forty-second embodiment, which is a method of servicing a wellbore with a conduit disposed therein to form an annular space between a wellbore wall and an outer surface of the conduit, comprising: placing a composition of any of the first through the thirty-eighth embodiments into at least a portion of the annular space, and allowing at least a portion of the composition to set.

A forty-third embodiment, which is the method of the forty-second embodiment, wherein placing the composition into at least a portion of the annular space comprises: circulating the composition down through the conduit and back up through the annular space.

A forty-fourth embodiment, which is method of the forty-second embodiment, wherein placing the composition into at least a portion of the annular space comprises; circulating the composition down through the annular space and back up through the conduit.

A forty-fifth embodiment, which is the method of any of the forty-second through the forty-fourth embodiments, wherein the conduit comprises casing.

A forty-sixth embodiment, which is the composition of any of the first through the forty-fifth embodiments, having a density of from about 500 kg/m$^3$ to about 3,000 kg/m$^3$.

A forty-seventh embodiment, which is the composition of any of the first through the forty-sixth embodiments, having a 7-day circumferential change in a range of from about 0.01% to about 2% at from about 20° C./68° F. to about 150° C./302° F., when measured in a ring expansion test in accordance with test standard API 10B-5.

A forty-eighth embodiment, which is the composition of any of the first through the forty-seventh embodiments, having a 14-day circumferential change in a range of from about 0.01% to about 2% at from about 20° C./68° F. to about 150° C./302° F., when measured in a ring expansion test in accordance with test standard API 10B-5.

A forty-ninth embodiment, which is the composition of any of the first through the forty-eighth embodiments, having a thickening time to reach about 50 Bearden units of consistency (Bc) in a range of from about 2 hours to about 20 hours at about 10° C./50° F., when measured in accordance with test standard API-RP-10B-2.

A fiftieth embodiment, which is the composition of any of the first through the forty-ninth embodiments, having a thickening time to reach about 50 Bc in a range of from about 2 hours to about 20 hours at about 20° C./68° F., when measured in accordance with test standard API-RP-10B-2.

A fifty-first embodiment, which is the composition of any of the first through the fiftieth embodiments, having an increasing compressive strength as time increases from about 1 week to about 6 weeks, at a temperature about 80° C./176° F. to about 180° C./356° F. in an ultrasonic cement analyzer (UCA) test when measured in accordance with test standard API-RP-10B-2.

A fifty-second embodiment, which is the composition of any of the first through the fifty-first embodiments, having a 28-day permeability of equal to or less than about 30 μD at from about 20° C./68° F. to about 80° C./176° F. when measured in accordance with test standard API-RP-10B-2.

A fifty-third embodiment, which is the composition of any of the first through the fifty-second embodiments, having a 28-day permeability of equal to or less than about 30 μD at from about 80° C./176° F. to about 150° C./302° F. when measured in accordance with test standard API-RP-10B-2.

A fifty-fourth embodiment, which is the composition of any of the first through the fifty-third embodiments, having a 7-day unconfined compressive strength (UCS) of from about 200 psi to about 5,000 psi at from about 20° C./68° F. to about 150° C./302° F. when measured in accordance with test standard ASTM D7012-14e1.

A fifty-fifth embodiment, which is the composition of any of the first through the fifty-fourth embodiments, having a 7-day tensile strength (TS) of from about 25 psi to about 1,000 psi at from about 20° C./68° F. to about 150° C./302° F. when measured in accordance with test standard ASTM D3967-16.

A fifty-sixth embodiment, which is the composition of any of the first through the fifty-fifth embodiments, having a 7-day Young's modulus (YM) of from about 2 GPa to about 14 GPa at from about 20° C./68° F. to about 150° C./302° F.

A fifty-seventh embodiment, which is the composition of any of the first through the fifty-sixth embodiments, having a time to reach 50 psi compressive strength in a range of from about 2 hours to about 24 hours at from about 20° C./68° F. to about 150° C./302° F. in an ultrasonic cement analyzer (UCA) test, when measured in accordance with test standard API-RP-10B-2.

A fifty-eighth embodiment, which is the composition of any of the first through the fifty-seventh embodiments, having a 24-hour compressive strength in a range of from about 50 psi to about 10,000 psi at from about 10° C./50° F. to about 80° C./176° F. in a UCA test when measured in accordance with test standard API-RP-10B-2.

A fifty-ninth embodiment, which is the composition of any of the first through the fifty-eighth embodiments, having a 28-day compressive strength in a range of from about 50 psi to about 10,000 psi at about 80° C./176° F. to about 150° C./302° F. in a UCA test when measured in accordance with test standard API-RP-10B-2.

A sixtieth embodiment, which is the composition of any of the first through the fifty-ninth embodiments, having a yield corrected carbon footprint of equal to or less than about 800 kilograms of equivalent $CO_2$ per cubic meter of the composition ($kg/m^3$).

A sixty-first embodiment, which is the composition of any of the first through the sixtieth embodiments, being capable to withstand a temperature from about 0° C./32° F. to about 204° C./400° F.

While embodiments of the disclosure have been shown and described, modifications thereof can be made by one skilled in the art without departing from the spirit and teachings of the disclosure. The embodiments described herein are exemplary only, and are not intended to be limiting. Many variations and modifications of the disclosure disclosed herein are possible and are within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_L$, and an upper limit, $R_U$, is disclosed, any number falling within the range is specifically disclosed. In particular, the following numbers within the range are specifically disclosed: $R=R_L+k*(R_U-R_L)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. When a feature is described as "optional," both embodiments with this feature and embodiments without this feature are disclosed. Similarly, the present disclosure contemplates embodiments where this feature is required and embodiments where this feature is specifically excluded. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present disclosure. Thus, the claims are a further description and are an addition to the embodiments of the present disclosure.

What is claimed is:

1. A composition comprising (i) a blend comprising a cementitious material, a pozzolanic material, aplite, and (ii) an aqueous fluid, wherein the composition has a positive expansion upon setting,
   wherein the cementitious material comprises a Portland cement,
   wherein the pozzolanic material comprises Trass flour, pumice, calcined clay, ground granulated blast furnace slag, fly ash, or bentonite, and
   wherein the aplite is present in the composition in an amount from about 15% by weight of the blend (BWOB) to about 35% BWOB.

2. The composition of claim 1, wherein the aplite comprises granite and the pozzolanic material comprises Trass flour.

3. The composition of claim 2, wherein the blend further comprises silica fume.

4. The composition of claim 3, further comprising a sodium chloride and sodium sulfate blend.

5. The composition of claim 2, further comprising a sodium chloride and sodium sulfate blend.

6. The composition of claim 1, wherein the aplite comprises granite and the pozzolanic material comprises pumice.

7. The composition of claim 6, wherein the blend further comprises silica fume.

8. The composition of claim 7, further comprising a sodium chloride and sodium sulfate blend.

9. The composition of claim 1, wherein the aplite comprises granite and the pozzolanic material comprises calcined clay.

10. The composition of claim 1, wherein the aplite comprises granite and the pozzolanic material comprises ground granulated blast furnace slag.

11. The composition of claim 1, wherein the aplite comprises granite and the pozzolanic material comprises fly ash.

12. The composition of claim 1, wherein the aplite comprises granite and the pozzolanic material comprises bentonite.

13. The composition of claim 1, wherein the blend further comprises silica fume.

14. The composition of claim 1, further comprising a sodium chloride and sodium sulfate blend.

15. The composition of claim 1, further comprising a sodium chloride and sodium sulfate blend.

16. A method of servicing a wellbore penetrating a subterranean formation, comprising: placing a composition of claim 1 into the wellbore; and
   allowing the composition to form a set cement.

17. A composition comprising (i) a blend comprising a cementitious material, a pozzolanic material, aplite, and (ii) an aqueous fluid, wherein the composition has a positive expansion upon setting,
   wherein the cementitious material comprises a Portland cement,
   wherein the pozzolanic material comprises Trass flour, pumice, calcined clay, ground granulated blast furnace, fly ash, or bentonite, and
   wherein the aplite is present in the composition in an amount from about 15% BWOB to about 35% BWOB.

18. The composition of claim 17, wherein the composition further comprises silica fume.

19. The composition of claim 18, wherein the composition further comprises a sodium chloride and sodium sulfate blend.

20. The composition of claim 19, wherein the pozzolanic material comprises Trass flour.

21. The composition of claim 18, wherein the pozzolanic material comprises Trass flour.

22. The composition of claim 18, wherein the pozzolanic material comprises fly ash.

23. The composition of claim 17, wherein the composition further comprises a sodium chloride and sodium sulfate blend.

24. A method of servicing a wellbore penetrating a subterranean formation, comprising:
  placing a composition of claim 17 into the wellbore; and
  allowing the composition to form a set cement.

* * * * *